United States Patent
Tian et al.

(10) Patent No.: US 11,515,982 B2
(45) Date of Patent: Nov. 29, 2022

(54) SPECIAL USER INFORMATION FIELD FOR TRIGGER FRAME

(71) Applicant: QUALCOMM Incorporated, San Diego, CA (US)

(72) Inventors: Bin Tian, San Diego, CA (US); Stephen Jay Shellhammer, Ramona, CA (US); Yanjun Sun, San Diego, CA (US); Alfred Asterjadhi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 72 days.

(21) Appl. No.: 17/096,934

(22) Filed: Nov. 12, 2020

(65) Prior Publication Data
US 2022/0150025 A1    May 12, 2022

(51) Int. Cl.
*H04L 5/00* (2006.01)
*H04W 28/06* (2009.01)
*H04W 72/04* (2009.01)

(52) U.S. Cl.
CPC ........... *H04L 5/0053* (2013.01); *H04W 28/06* (2013.01); *H04W 72/0406* (2013.01)

(58) Field of Classification Search
CPC .. H04L 5/0053; H04W 28/06; H04W 72/0406
See application file for complete search history.

(56) References Cited

U.S. PATENT DOCUMENTS

2019/0238288 A1* 8/2019 Liu ................ H04L 5/0091
2020/0037356 A1* 1/2020 Lou ............... H04W 74/006
2020/0084772 A1* 3/2020 Sekiya ............ H04W 72/0453
(Continued)

OTHER PUBLICATIONS

Chen A., (Qualcomm): "U-SIG Design for TB PPDU", IEEE Draft, 11-20-1546-00-00BE-U-SIG-DESIGN-FOR-TB-PPDU, IEEE-SA Mentor, Piscataway, NJ USA, vol. 802.11 EHT, 802.11be, Sep. 29, 2020 (Sep. 29, 2020), pp. 1-11, XP068173638, Sep. 8, 2020, Retrieved from the Internet:URL:https://mentor.ieee.org/802.11/dcn/20/11-20-1546-00-00be-u-sig-design-for-tb-ppdu.pptx [retrieved on Sep. 29, 2020] slides 2 to 6.
(Continued)

*Primary Examiner* — Hashim S Bhatti
(74) *Attorney, Agent, or Firm* — Holland & Hart LLP

(57) ABSTRACT

This disclosure provides methods, devices and systems for soliciting trigger-based (TB) physical layer protocol convergence protocol (PLCP) protocol data units (PPDUs). Some implementations more specifically relate to trigger frame designs that support non-legacy TB PPDU formats. In some aspects, a trigger frame may carry information to be included in a physical layer (PHY) preamble of a TB PPDU solicited by the trigger frame. For example, the information may indicate values of one or more subfields of a universal signal field (U-SIG) associated with the non-legacy TB PPDU format. In some aspects, the information may be carried in a special user information field of the trigger frame. For example, the special user information field may be identified by a special association identifier (AID) value. The special AID value may be different than any AID values assigned to wireless communication devices in a basic service set (BSS) associated with the TB PPDU.

36 Claims, 19 Drawing Sheets

(56) References Cited

U.S. PATENT DOCUMENTS

| | | | |
|---|---|---|---|
| 2021/0321293 A1* | 10/2021 | Chen | H04L 27/2603 |
| 2022/0030572 A1* | 1/2022 | Shellhammer | H04W 72/048 |
| 2022/0078792 A1* | 3/2022 | Jeon | H04W 72/0453 |

OTHER PUBLICATIONS

International Search Report and Written Opinion—PCT/US2021/054572—ISA/EPO—dated Feb. 4, 2022.

Shellhammer S., (Qualcomm): "Enhanced Trigger Frame for EHT Support", IEEE Draft, 11-20-1429-02-00BE-Enhanced-Trigger-Frame-for-EHT-Support, IEEE-SA Mentor, Piscataway, NJ, USA vol. 802.11 EHT, 802.11be, No. 2, Oct. 14, 2020 (Oct. 14, 2020), pp. 1-30, XP068173782, Oct. 13, 2020, Retrieved from the Internet: URL: https://mentor.ieee.org/802.11/dcn/20/11-20-1429-02-00be-enhanced-trigger-frame-for-eht-support.pptx. [Retrieved on Oct. 14, 2020], slides 2 to 18.

* cited by examiner

*Figure 8*

SPECIAL USER INFORMATION FIELD FOR TRIGGER FRAME

TECHNICAL FIELD

This disclosure relates generally to wireless communication, and more specifically to special user information fields for trigger frames used in wireless communications.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Existing versions of the IEEE 802.11 standard support trigger-based uplink communications. In particular, the IEEE 802.11ax amendment of the IEEE 802.11 standard defines a trigger frame format which can be used to solicit the transmission of trigger-based (TB) physical layer convergence protocol (PLCP) data units (PPDUs) from one or more STAs. The trigger frame allocates resources for the transmission of the TB PPDUs and indicates how the TB PPDUs are to be configured for transmission. New WLAN communication protocols are being developed to enable enhanced WLAN communication features such as, for example, increases in bandwidth and number of spatial streams. As new WLAN communication protocols enable enhanced features, new trigger frame formats are needed to support the new features and formats of TB PPDUs.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include receiving a trigger frame soliciting a physical layer convergence protocol (PLCP) protocol data unit (PPDU) to be transmitted by the wireless communication device, where the trigger frame includes a medium access control (MAC) header, a common information field that follows the MAC header, and one or more user information fields that follow the common information field, where the common information field carries information that is common to each user associated with the one or more user information fields; determining that a first user information field of the one or more user information fields carries information to be included in a physical layer (PHY) preamble of the PPDU based on an association identifier (AID) value associated with the first user information field; generating the PHY preamble based on the information carried in the first user information field; and transmitting the PPDU including the PHY preamble, over a wireless channel, responsive to the reception of the trigger frame.

In some implementations, the AID value is a special AID value and is not assigned to any wireless communication devices associated with the same basic service set (BSS) as the wireless communication device. In some implementations, the method further includes determining that a second user information field of the one or more user information fields carries additional information to be included in the PHY preamble based on an AID value associated with the second user information field. In some implementations, the PHY preamble includes a legacy signal field (L-SIG), a repeat of L-SIG (RL-SIG) that immediately follows L-SIG, and a universal signal field (U-SIG) that immediately follows RL-SIG and carries information for interpreting one or more subsequent fields of the PHY preamble.

In some implementations, the generating of the PHY preamble includes determining values for one or more subfields of U-SIG based on the information carried in the first user information field, where the one or more subfields include at least one of a PPDU bandwidth subfield that carries information indicating a bandwidth of the wireless channel, a spatial reuse subfield that carries information indicating whether spatial reuse is permitted on one or more subchannels of the wireless channel, or a version identifier subfield that carries information indicating a version of a physical layer wireless communication protocol associated with the PPDU.

In some implementations, the generating of the PHY preamble includes determining values for one or more subfields of U-SIG based on the information carried in the first user information field, where the one or more subfields include at least one of an uplink or downlink (UL/DL) subfield that carries information indicating whether the PPDU is transmitted in the uplink or the downlink direction, a BSS color subfield that carries information indicating a BSS color associated with the PPDU, a transmit opportunity (TXOP) subfield that carries information indicating a TXOP duration associated with the PPDU, or a PPDU format and compression mode subfield that carries information indicating a format of the PPDU.

In some implementations, the generating of the PHY preamble includes determining a number of reserved bits to be included in U-SIG based on the information carried in the first user information field. In some implementations, the method further includes determining a version of a physical layer wireless communication protocol associated with the PPDU based on the AID value associated with the first user information field; and configuring a version identifier subfield of U-SIG to carry information indicating the determined version of the physical layer wireless communication protocol.

In some implementations, the method further includes determining whether puncturing is to be performed on one or more subchannels of the wireless channel based on the information carried in the first user information field or information carried in the common information field. In some implementations, the method further includes determining a format of the trigger frame based on information carried in the common information field, where the format is a legacy trigger frame format or a non-legacy trigger frame format; and determining that the one or more user information fields includes the first user information field based on the determined format of the trigger frame.

In some implementations, the method further includes determining a version of a physical layer wireless communication protocol associated with the one or more user information fields based on information carried in at least one of the common information field or the first user information field, where the version of the physical layer wireless communication protocol is the same for each of the one or more user information fields; and interpreting the information carried in the first user information field based on the determined PHY version.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including receiving a trigger frame soliciting a PPDU to be transmitted by the wireless communication device, where the trigger frame includes a MAC header, a common information field that follows the MAC header, and one or more user information fields that follow the common information field, where the common information field carries information that is common to each user associated with the one or more user information fields; determining that a first user information field of the one or more user information fields carries information to be included in a PHY preamble of the PPDU based on an AID value associated with the first user information field; generating the PHY preamble based on the information carried in the first user information field; and transmitting the PPDU including the PHY preamble, over a wireless channel, responsive to the reception of the trigger frame.

Another innovative aspect of the subject matter described in this disclosure can be implemented as a method of wireless communication. The method may be performed by a wireless communication device, and may include determining information to be included in a PHY preamble of a trigger-based (TB) PPDU; and transmitting a trigger frame soliciting the TB PPDU to be transmitted, over a wireless channel, by a receiving device, where the trigger frame includes a MAC header, a common information field that follows the MAC header, and one or more user information fields that follow the common information field, where the common information field carries information that is common to each user associated with the one or more user information fields, and where the one or more user information fields includes a first user information field that carries the information to be included in the PHY preamble of the TB PPDU.

In some implementations, the first user information field is associated with a special AID value and is not assigned to any wireless communication devices associated with the same BSS as the receiving device. In some implementations, the method may further include determining the special AID value based on a version of a physical layer wireless communication protocol associated with the TB PPDU. In some implementations, the one or more user information fields further includes a second user information field that carries additional information to be included in the PHY preamble. In some implementations, the PHY preamble includes an L-SIG, an RL-SIG that immediately follows L-SIG, and a U-SIG that immediately follows RL-SIG and carries information for interpreting one or more subsequent fields of the PHY preamble.

In some implementations, the information carried in the first user information field indicates values for one or more subfields of U-SIG, where the one or more subfields includes at least one of a PPDU bandwidth subfield that carries information indicating a bandwidth of the wireless channel, a spatial reuse subfield that carries information indicating whether spatial reuse is permitted on one or more subchannels of the wireless channel, or a version identifier subfield that carries information indicating a version of a physical layer wireless communication protocol associated with the PPDU.

In some implementations, the information carried in the first user information field indicates values for one or more subfields of U-SIG, where the one or more subfields includes at least one of a UL/DL subfield that carries information indicating whether the PPDU is transmitted in the uplink or the downlink direction, a BSS color subfield that carries information indicating a BSS color associated with the PPDU, a TXOP subfield that carries information indicating a TXOP duration associated with the PPDU, or a PPDU format and compression mode subfield that carries information indicating a format of the PPDU.

In some implementations, the information carried in the first user information field indicates a number of reserved bits to be included in U-SIG. In some implementations, the method further includes. In some implementations, the method further includes determining whether puncturing is to be performed on one or more subchannels of the wireless channel, where at least one of the common information field or the first user information field carries channel puncturing information indicating whether puncturing is to be performed on the one or more subchannels.

In some implementations, the common information field carries information indicating a format of the trigger frame, where the format is a legacy trigger frame format or a non-legacy trigger frame format. In some implementations, at least one of the common information field or the first user information field further carries information indicating a version of a physical layer wireless communication protocol associated with the one or more user information fields, where the version of the physical layer wireless communication protocol is the same for each of the one or more user information fields.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including determining information to be included in a PHY preamble of a TB PPDU; and transmitting a trigger frame soliciting the TB PPDU to be transmitted, over a wireless channel, by a receiving device, where the trigger frame includes a MAC header, a common information field that follows the MAC header, and one or more user information fields that follow the common information field, where the common information field carries information that is common to each user associated with the one or more user information fields, and where the one or more user information fields includes a first user information field that carries the information to be included in the PHY preamble of the TB PPDU.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 8 shows an example frame structure of a non-legacy PPDU allocated over multiple subchannels of a wireless channel according to some implementations.

Like reference numbers and designations in the various drawings indicate like elements.

DETAILED DESCRIPTION

Figure 1:
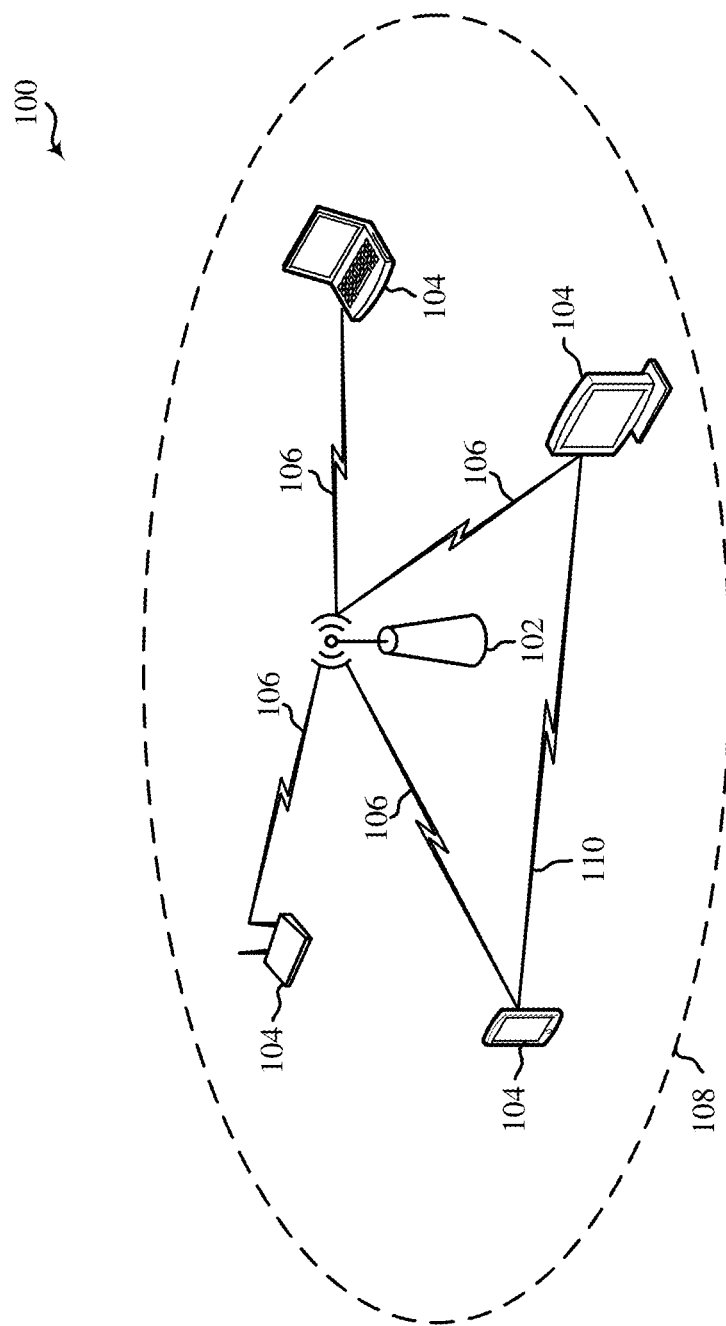
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to trigger-based communications that support new wireless communication protocols, and more particularly, to trigger frame designs that support non-legacy trigger-based (TB) physical layer convergence protocol (PLCP) protocol data units (PPDU) formats. As used herein, the term "non-legacy" may refer to PPDU formats and communication protocols conforming to the IEEE 802.11be amendment, and future generations, of the IEEE 802.11 standard. In contrast, the term "legacy" may be used herein to refer to PPDU formats and communication protocols conforming to the IEEE 802.11ax amendment of the IEEE 802.11 standard. In some aspects, a trigger frame may carry information to be included in a physical layer (PHY) preamble of a TB PPDU solicited by the trigger frame (referred to herein as "preamble information"). For example, the preamble information may indicate values of one or more subfields of a universal signal field (U-SIG) associated with the non-legacy TB PPDU format. In some aspects, the preamble information may be carried in a special user information field of the trigger frame. For example, the special user information field may be identified by a special association identifier (AID) value that is reserved in the legacy version of the IEEE 802.11 standard. The special AID value may be different than any AID values assigned to wireless communication devices in a basic service set (BSS) associated with the TB PPDU.

Particular implementations of the subject matter described in this disclosure can be implemented to realize one or more of the following potential advantages. By soliciting transmission of non-legacy TB PPDUs, the trigger frame designs of the present disclosure may support gains in data throughput achievable in accordance with the IEEE 802.11be amendment, and future generations, of the IEEE 802.11 standard. For example, aspects of the present disclosure recognize that some fields of the PHY preamble (such as U-SIG) are configured per 20 MHz subchannel. In other words, all wireless communication devices transmitting PPDUs concurrently on the same (or overlapping) 20 MHz subchannel must transmit identical information in the U-SIG of their respective PPDUs within that 20 MHz subchannel. By including preamble information in a trigger frame, aspects of the present disclosure may enable the receiving device to configure the U-SIG of the solicited TB PPDU to be consistent with (or identical to) the U-SIG of other PPDUs concurrently transmitted on the same 20 MHz subchannels. By providing the preamble information in a special user information field (associated with a reserved AID value in the legacy version of the IEEE 802.11 standard), the trigger frame designs of the present disclosure may be compatible with legacy and non-legacy versions of the IEEE 802.11 standard.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

Some APs and STAs may be configured to implement spatial reuse techniques. For example, APs and STAs configured for communications using IEEE 802.11ax or 802.11be may be configured with a BSS color. APs associated with different BSSs may be associated with different BSS colors. If an AP or a STA detects a wireless packet from another wireless communication device while contending for access, the AP or STA may apply different contention parameters based on whether the wireless packet is transmitted by, or transmitted to, another wireless communication device within its BSS or from a wireless communication device from an overlapping BSS (OBSS), as determined by a BSS color indication in a preamble of the wireless packet. For example, if the BSS color associated with the wireless packet is the same as the BSS color of the AP or STA, the AP or STA may use a first received signal strength indication (RSSI) detection threshold when performing a CCA on the wireless channel. However, if the BSS color associated with the wireless packet is different than the BSS color of the AP or STA, the AP or STA may use a second RSSI detection threshold in lieu of using the first RSSI detection threshold when performing the CCA on the wireless channel, the second RSSI detection threshold being greater than the first RSSI detection threshold. In this way, the requirements for winning contention are relaxed when interfering transmissions are associated with an OBSS.

Figure 2A:
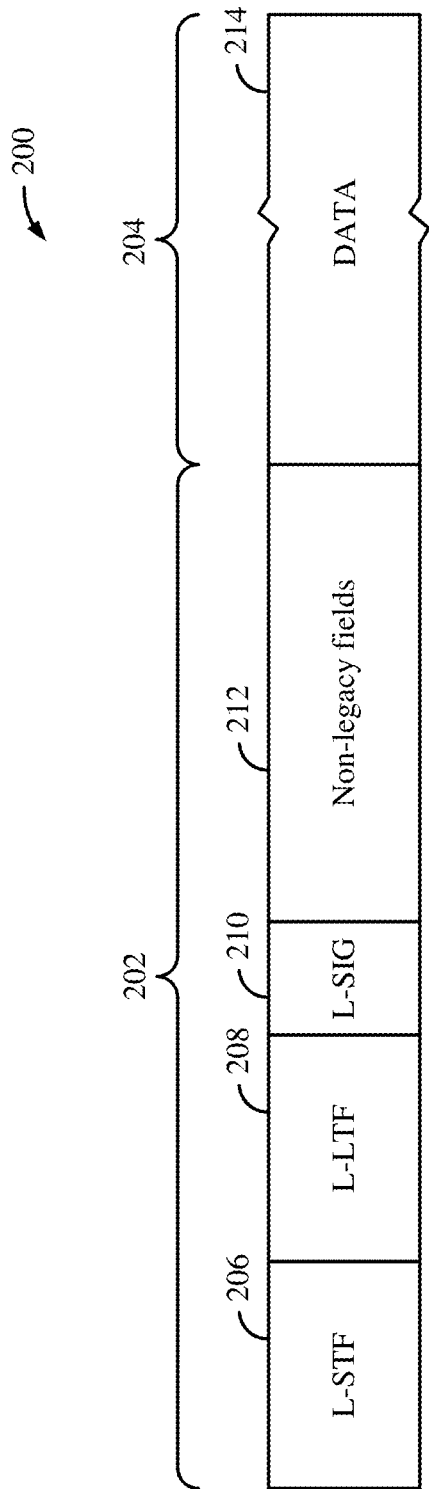
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
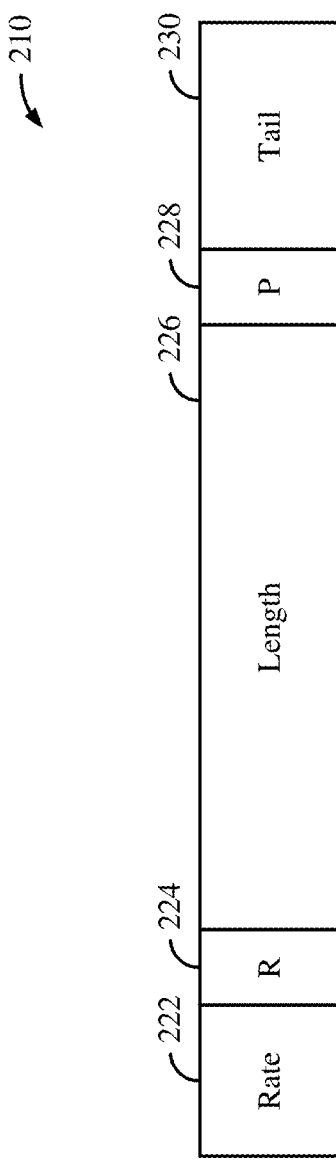
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3:
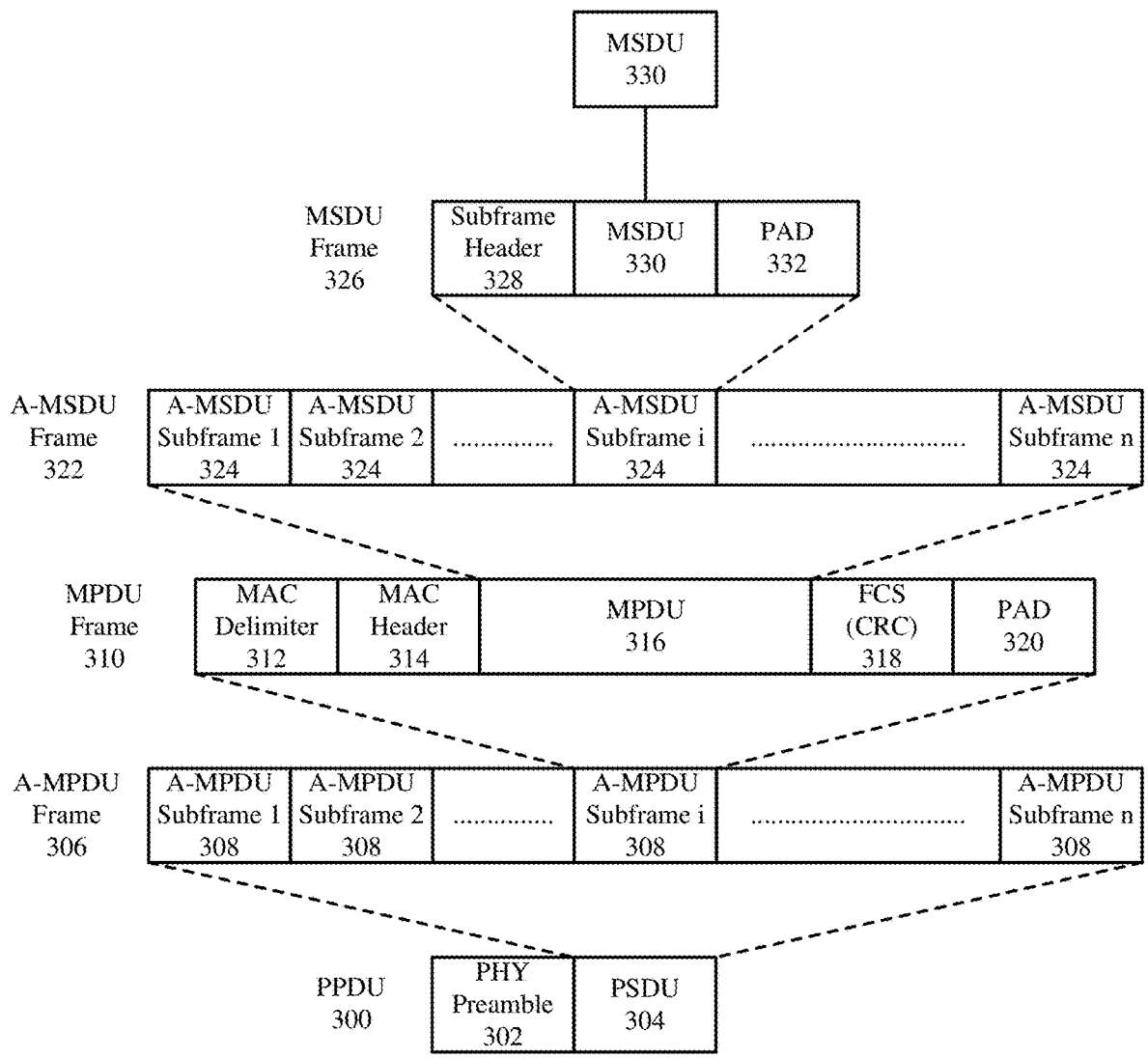
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 316. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
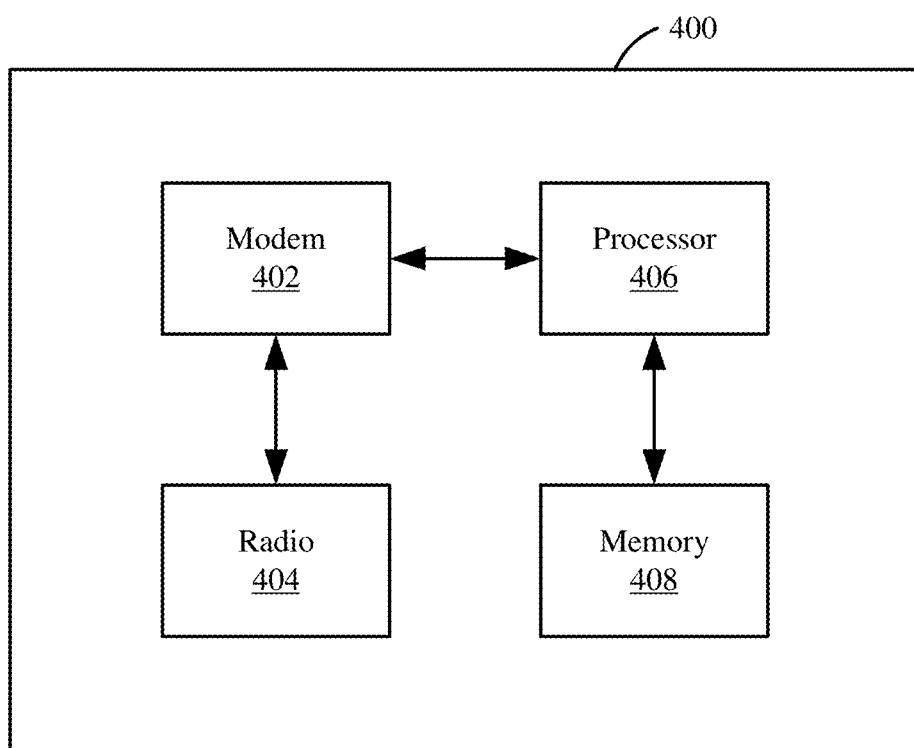
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 404 can include tangible storage media such as random-access memory (RAM) or read-only memory (ROM), or combinations thereof. The memory 404 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
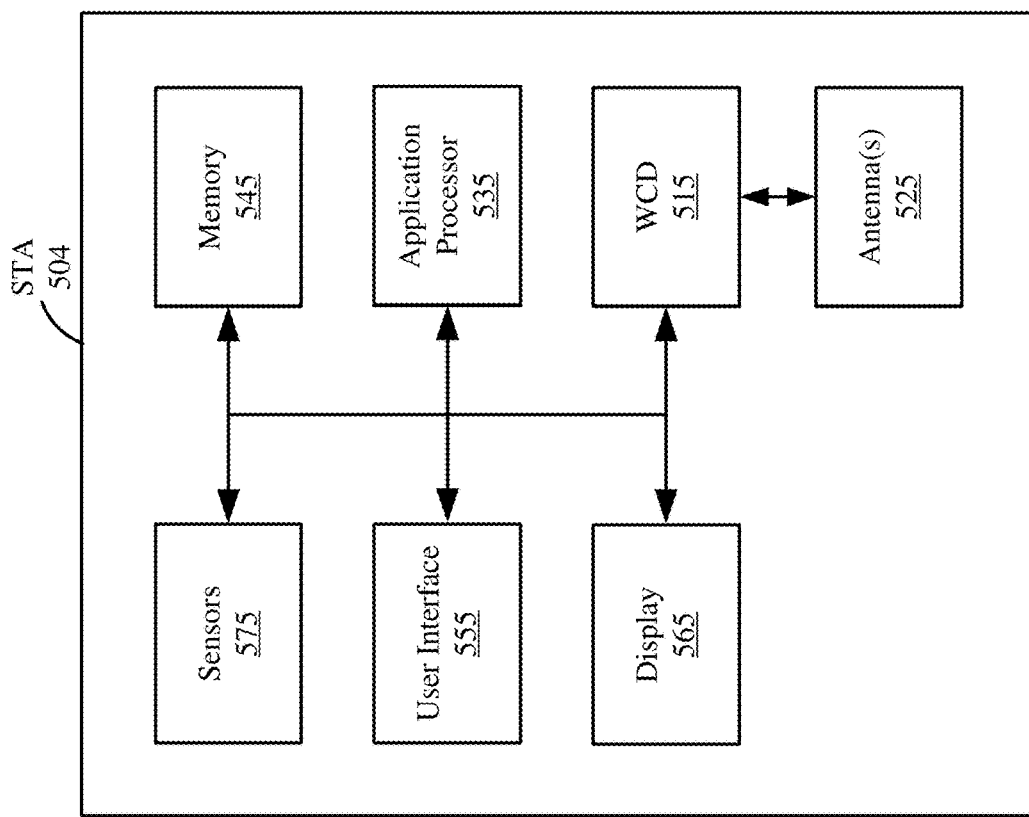
FIG. 5B shows a block diagram of an example STA.
Figure 5A:
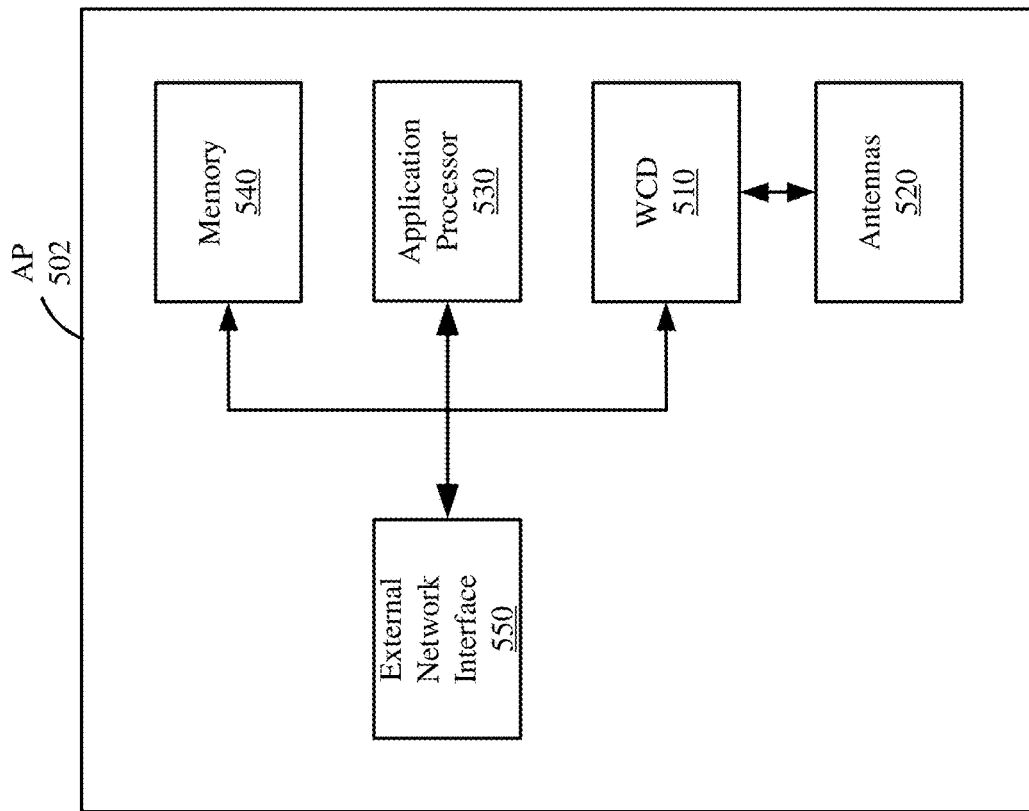
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, new WLAN communication protocols are being developed to enable enhanced WLAN communication features. Such enhanced features include, among other examples, increases in bandwidth (up to 320 MHz) and number of spatial streams (up to 16 spatial streams), as well as support for multiple-resource unit (M-RU) allocations. As new wireless communication protocols enable enhanced features, new preamble designs are needed support signaling regarding features and resource allocations. Signaling refers to control fields or information that can be used by a wireless communication device to interpret another field or portion of a packet. For some wireless communication techniques, such as OFDMA, a wireless channel may utilize multiple subchannels that can be divided or grouped in a transmission to form different resource units (RUs). The signaling can indicate which RUs include data for a particular recipient. Other types of signaling include indicators regarding which subchannels carry further signaling or which subchannels are punctured. Still further, some signaling can indicate the lengths or availability of one or more fields or subfields in the data packet.

Figure 6:
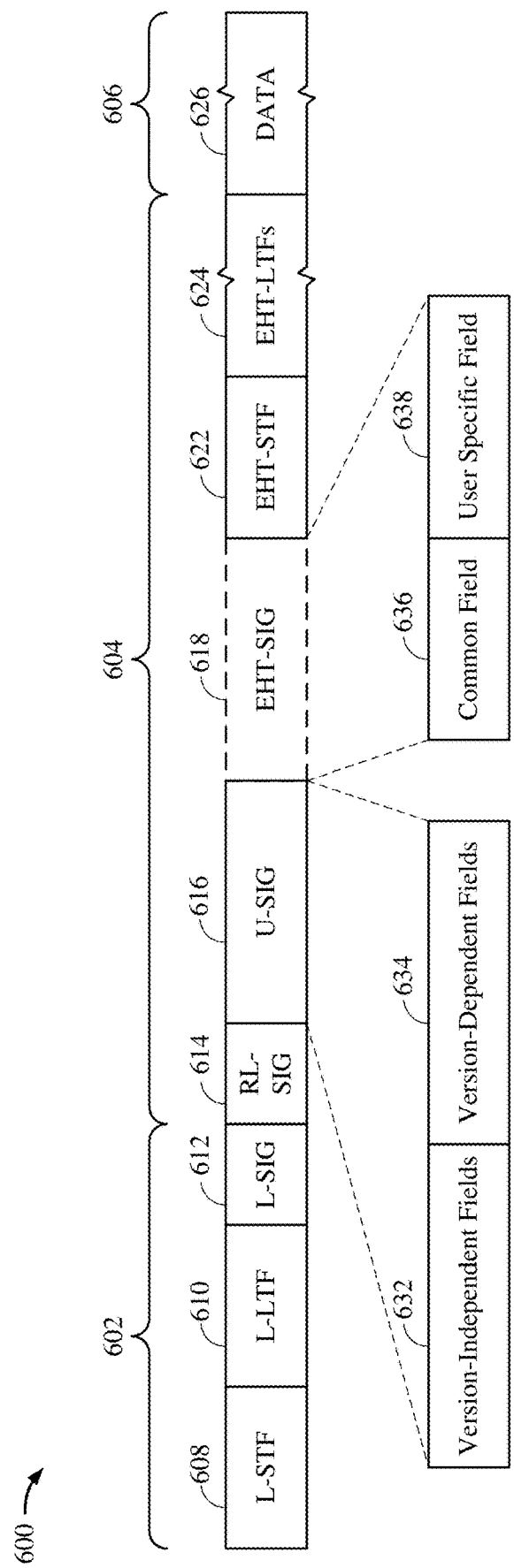
FIG. 6 shows an example PPDU usable for communications between an AP and a number of STAs according to some implementations.

FIG. 6 shows an example PPDU 600 usable for wireless communication between an AP and a number of STAs according to some implementations. The PPDU 600 includes a PHY preamble including a first portion 602 and a second portion 604. The PPDU 600 may further include a PHY payload 606 after the preamble, for example, in the form of a PSDU carrying a DATA field 626. In some implementations, the PPDU 600 may be formatted as a non-legacy or Extremely High Throughput (EHT) PPDU.

The first portion 602 of the PHY preamble includes L-STF 608, L-LTF 610, and L-SIG 612. The second portion 604 of the PHY preamble includes a repeated legacy signal field (RL-SIG) 614, a universal signal field (U-SIG) 616, a non-legacy short training field (EHT-STF) 622, and a number of non-legacy long training fields (EHT-LTFs) 624. In some implementations, the second portion 604 may further include a non-legacy signal field (EHT-SIG) 618. In the IEEE 802.11be amendment, and future generations of the IEEE 802.11 standard, new fields may be used to carry signaling information. For example, at least some of the new fields and signaling information may be included in U-SIG 616. Additionally, new fields and signaling information may be included in EHT-SIG 618 (or may overflow from U-SIG 616 into EHT-SIG 618).

In some implementations, U-SIG 616 may include signaling regarding types or formats of additional signal fields that may follow U-SIG 616. Such signaling may be carried in one or more version-independent fields 632 and one or more version-dependent fields 634. The version-independent fields 632 may include, for example, a version identifier subfield carrying information indicating a version of the associated wireless communication protocol (starting from the IEEE 802.11be amendment and beyond) and a PPDU bandwidth subfield carrying information indicating a bandwidth associated with the PPDU 600 (such as from 20 MHz to 320 MHz). The version-dependent fields 634 may carry information used for interpreting other fields of U-SIG 616 or EHT-SIG 618. Example version-dependent fields 634 include a PPDU format and EHT-SIG compression subfield carrying information indicating a format of the PPDU 600 and one or more spatial reuse subfields carrying information indicating whether spatial reuse is permitted on one or more subchannels of the wireless channel over which the PPDU 600 is transmitted.

In some implementations, the U-SIG 616 also may include a number of reserved bits. Reserved bits represent unused bits that are reserved for future implementations of the IEEE 802.11 standard. In some aspects, one or more reserved bits in an earlier version or release of the IEEE 802.11 standard may be repurposed (to carry information) in a later version or release. For example, some reserved bits in U-SIG 616 may be repurposed, in later versions or releases of the IEEE 802.11 standard, to expand a range of values that can be represented by existing fields in an earlier version or release. Some other reserved bits in U-SIG 616 may be repurposed, in later versions or releases of the IEEE 802.11 standard, to convey information that is unrelated to any information conveyed in the earlier version or release (or remains unused in the later version or release).

In some aspects, EHT-SIG 618 may include a common field 636. The common field 636 may include U-SIG overflow representing one or more bits or fields overflowed from U-SIG 616 or an RU allocation subfield carrying information indicating an allocation of RUs for intended recipients of the PPDU 600. In some other aspects, EHT-SIG 618 also may include a user specific field 638. The user specific field 638 may include a number of user fields carrying per-user information for intended recipients of the PPDU 600. As described in greater detail with reference to FIGS. 7A-7C, the contents and availability of EHT-SIG 618 may depend on the format of the PPDU 600. For example, in single-user (SU) and multi-user (MU) PPDU formats, the second portion 604 of the PPDU 600 may include the EHT-SIG 618. On the other hand, EHT-SIG 618 may be absent or omitted in the trigger-based (TB) PPDU format. Table 1, below, shows a more detailed representation of the various fields and subfields of the PPDU 600 based on the TB PPDU format.

TABLE 1

| Field | Category | Subfield | # Bits |
|---|---|---|---|
| U-SIG | Version Independent | Version Identifier | 3 |
| | | PPDU BW | 3 |
| | | UL/DL | 1 |
| | | BSS Color | 6 |
| | | TXOP | 7 |
| | | Reserved | 6 |
| | Version Dependent | PPDU Format & EHT-SIG Compression | 2 |
| | | Reserved | 1 |
| | | Spatial Reuse 1 | 4 |
| | | Spatial Reuse 2 | 4 |
| | | Reserved | 5 |
| | CRC & Tail | CRC in U-SIG | 4 |
| | | Tail in U-SIG | 6 |
| | | Total # Bits in U-SIG | 52 |

Figure 7A:
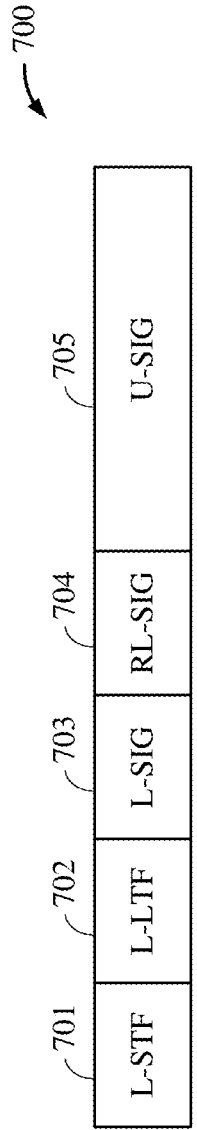
FIG. 7A shows an example frame structure for a trigger-based (TB) PPDU according to some implementations.

FIG. 7A shows an example frame structure for a TB PPDU 700 according to some implementations. In some implementations, the TB PPDU 700 may be one example of the PPDU 600 of FIG. 6. For simplicity, only the pre-EHT portion of the TB PPDU 700 (corresponding to the portion 650 of PPDU 600) is shown in FIG. 7A. The TB PPDU 700 includes an L-STF 701, an L-LTF 702, an L-SIG 703, an RL-SIG 704, and a U-SIG 705 which may correspond to L-STF 608, L-LTF 610, L-SIG 612, RL-SIG 614, and U-SIG 616, respectively, of PPDU 600. In the example TB PPDU format, the TB PPDU 700 may not include an EHT-SIG. As a result, the TB PPDU 700 may not include any U-SIG overflow, RU allocation information, or other user-specific information (such as provided in the user specific field 638 of FIG. 6).

Figure 7B:
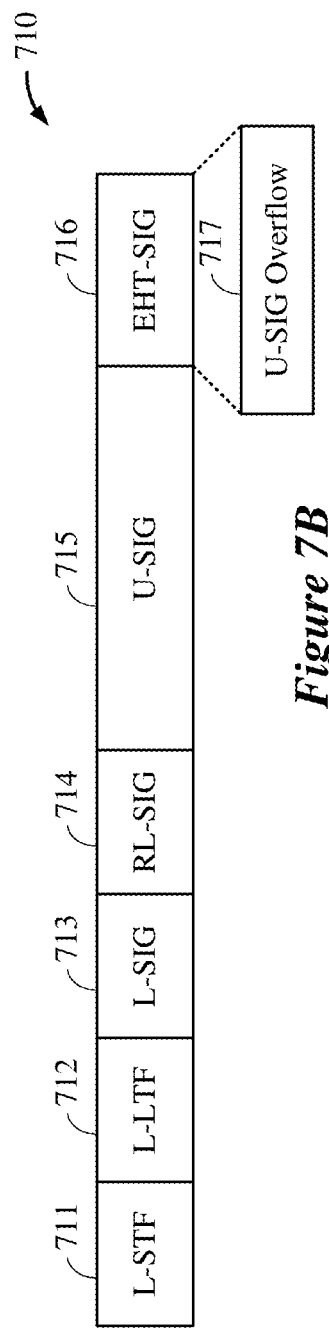
FIG. 7B shows an example frame structure for a single-user (SU) PPDU according to some implementations.

FIG. 7B shows an example frame structure for an SU PPDU 710 according to some implementations. In some implementations, the SU PPDU 710 may be one example of the PPDU 600 of FIG. 6. For simplicity, only the pre-EHT portion of the SU PPDU 710 (corresponding to the portion 650 of PPDU 600) is shown in FIG. 7B. The SU PPDU 710 includes an L-STF 711, an L-LTF 712, an L-SIG 713, an RL-SIG 714, a U-SIG 715, and an EHT-SIG 716 which may correspond to L-STF 608, L-LTF 610, L-SIG 612, RL-SIG 614, U-SIG 616, and EHT-SIG 616, respectively, of PPDU 600. In the example SU PPDU format, EHT-SIG 716 may include only bits or fields 717 overflowed from U-SIG 715. More specifically, the SU PPDU 710 may not include any RU allocation information, or other user-specific information (such as provided in the user specific field 638 of FIG. 6).

Figure 7C:
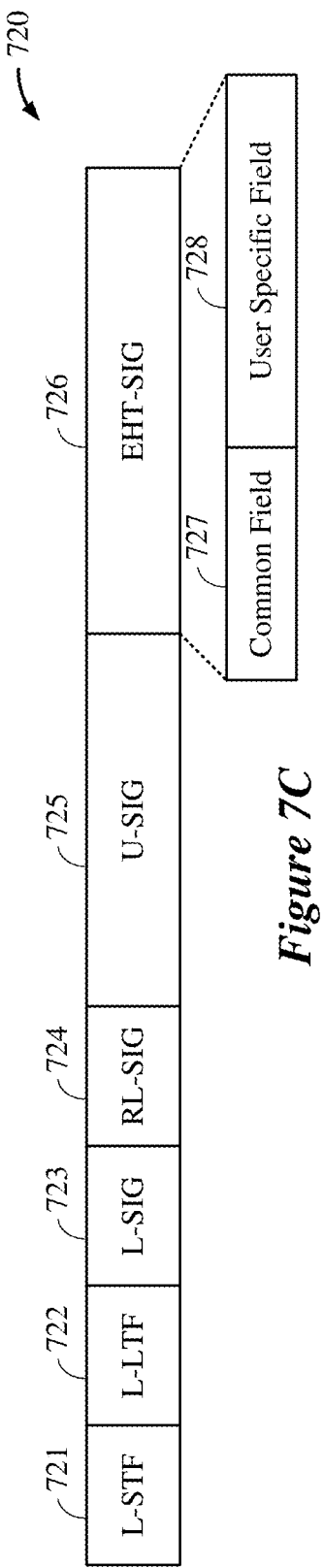
FIG. 7C shows an example frame structure for a multi-user (MU) PPDU according to some implementations.

FIG. 7C shows an example frame structure for an MU PPDU 720 according to some implementations. In some implementations, the MU PPDU 720 may be one example of the PPDU 600 of FIG. 6. For simplicity, only the pre-EHT portion of the MU PPDU 720 (corresponding to the portion 650 of PPDU 600) is shown in FIG. 7C. The MU PPDU 720 includes an L-STF 721, an L-LTF 722, an L-SIG 723, an RL-SIG 724, a U-SIG 725, and an EHT-SIG 726 which may correspond to L-STF 608, L-LTF 610, L-SIG 612, RL-SIG 614, U-SIG 616, and EHT-SIG 616, respectively, of PPDU 600. In the example MU PPDU format, EHT-SIG 726 may include a common field 727 and a user specific field 728. Thus, the MU PPDU 720 may include per-user information (such as in the user specific field 728) for one or more intended recipients of the MU PPDU 720.

Figure 8:
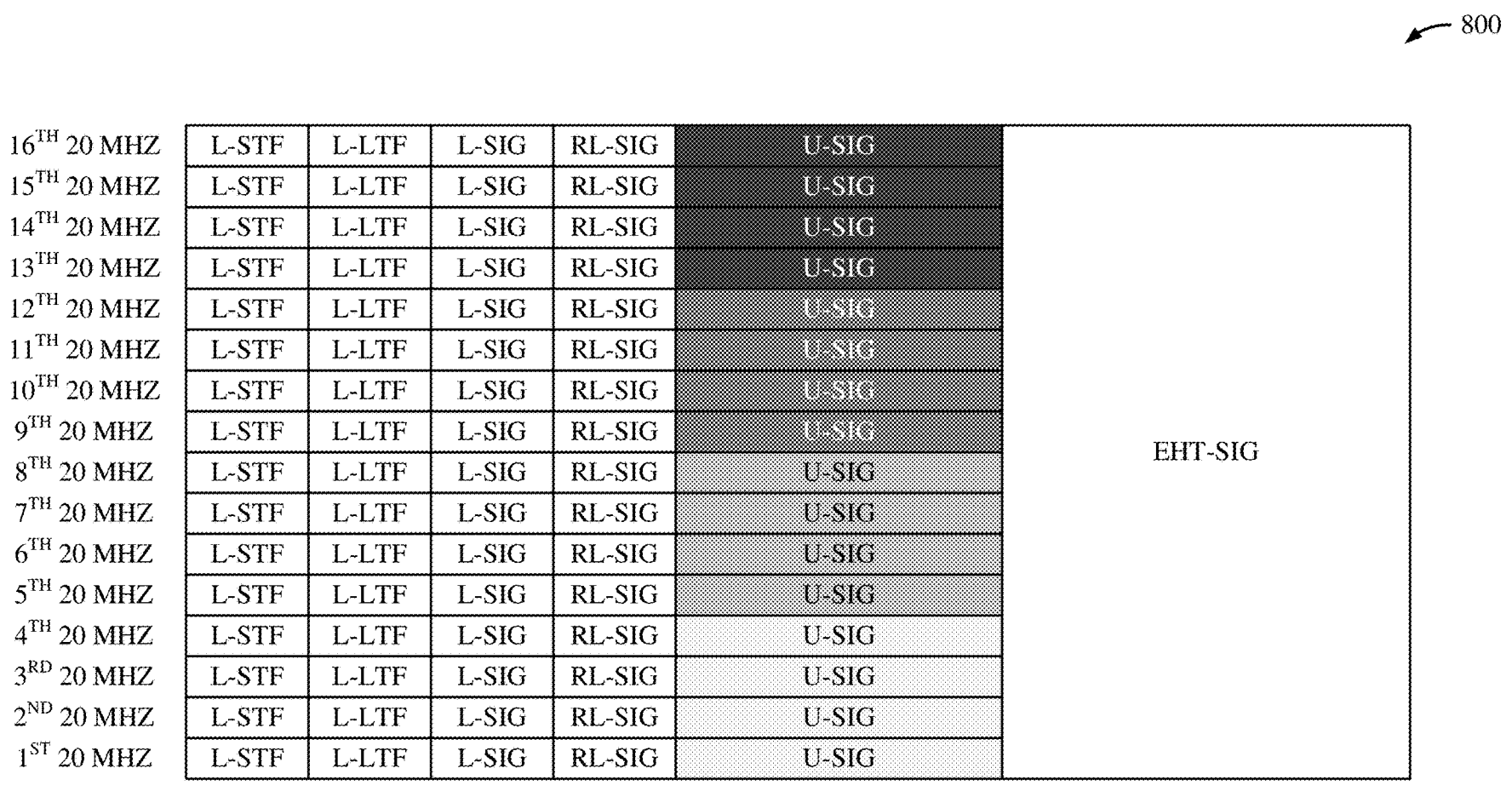

FIG. 8 shows an example frame structure of a non-legacy PPDU 800 allocated over multiple subchannels of a wireless channel according to some implementations. In some implementations, the EHT PPDU 800 may be one example of the PPDU 600 of FIG. 6. In the example of FIG. 8, the EHT PPDU 800 is shown to include an L-STF, an L-LTF, an L-SIG, an RL-SIG, a U-SIG, and an EHT-SIG signaled or transmitted on multiple 20 MHz subchannels (or frequency segments) of a 320 MHz wireless channel. In some other implementations, the wireless channel may encompass any range of frequencies including, but not limited to, a 160 MHz frequency spectrum, a 240 MHz frequency spectrum, a 480 MHz frequency spectrum, or a 640 MHz frequency spectrum. As shown in FIG. 8, the 320 MHz frequency spectrum includes sixteen 20 MHz subchannels indexed from lowest to highest (such as from the $1^{st}$ to the $16^{th}$).

In the example of FIG. 8, L-STF, L-LTF, L-SIG, and RL-SIG are duplicated or repeated in each 20 MHz subchannel spanning the entirety of the 320 MHz frequency spectrum. In some implementations, U-SIG may be duplicated or repeated in each 20 MHz subchannel of a respective 80 MHz segment of the wireless channel. For example, the first four subchannels ($1^{st}$ through $4^{th}$) may share the same U-SIG fields and values. The next four subchannels ($5^{th}$ through $8^{th}$) may share the same U-SIG fields and values, which may be different than the U-SIG fields or values of the previous four subchannels. The next four subchannels ($9^{th}$ through $12^{th}$) may share the same U-SIG fields and values, which in turn may be different than the U-SIG fields or values in any of the previous eight subchannels. The next four subchannels ($13^{th}$ through $16^{th}$) may share the same U-SIG fields and values, which in turn may be different than the U-SIG fields or values in any of the previous twelve subchannels. In other words, the U-SIG fields or values may change every 80 MHz. This may allow for greater parallelization of U-SIG information across the various subchannels.

In some implementations, EHT-SIG may be signaled on a number of content channels. Each content channel may be defined by a particular grouping of subchannels. For example, a first content channel may carry the signaling information for all odd-numbered subchannels (such as the $1^{st}$, $3^{rd}$, $5^{th}$, $7^{th}$, $9^{th}$, $11^{th}$, $13^{th}$, and $15^{th}$ 20 MHz subchannels) and a second content channel may carry the signaling information for all even-numbered subchannels (such as the $2^{nd}$, $4^{th}$, $6^{th}$, $8^{th}$, $10^{th}$, $12^{th}$, $14^{th}$, and $16^{th}$ 20 MHz subchannels). In some implementations, EHT-SIG may be duplicated or repeated per content channel. For example, the (odd-numbered) subchannels associated with the first content channel may share the same EHT-SIG fields and values. The (even-numbered) subchannels associated with the second content channel may share the same EHT-SIG fields and values, which may be different than the EHT-SIG fields or values of the first content channel.

As described above, existing versions of the IEEE 802.11 standard support trigger-based uplink communications. In particular, the IEEE 802.11ax amendment of the IEEE 802.11 standard defines a trigger frame format which can be used to solicit the transmission of TB PPDUs from one or more STAs. The trigger frame allocates resources for the transmission of the TB PPDUs and indicates how the TB PPDUs are to be configured for transmission. As new WLAN communication protocols enable enhanced features, new trigger frame formats are needed to support the new features in TB PPDUs. For example, some fields in the PHY preamble (such as U-SIG) of the non-legacy PPDU format are configured per 20 MHz subchannel. In some aspects, U-SIG may be further duplicated on multiple 20 MHz subchannels (such as described with reference to FIG. 8). As a result, all wireless communication devices transmitting PPDUs concurrently on the same (or overlapping) 20 MHz subchannels must transmit identical information in the U-SIG of their respective PPDUs within such 20 MHz subchannels. Accordingly, new trigger frame designs are needed to configure and solicit the transmission of non-legacy TB PPDUs such as described, for example, with reference to FIGS. 6-8.

Various aspects relate generally to trigger-based communications that support new wireless communication protocols, and more particularly, to trigger frame designs that support non-legacy TB PPDU formats. As used herein, the term "non-legacy" may refer to PPDU formats and communication protocols conforming to the IEEE 802.11be amendment, and future generations, of the IEEE 802.11 standard. In contrast, the term "legacy" may be used herein to refer to PPDU formats and communication protocols conforming to the IEEE 802.11ax amendment of the IEEE 802.11 standard. In some aspects, a trigger frame may carry information to be included in a PHY preamble of a TB PPDU solicited by the trigger frame (referred to herein as "preamble information"). For example, the preamble information may indicate values of one or more subfields of a U-SIG associated with the non-legacy TB PPDU format. In some aspects, the preamble information may be carried in a special user information field of the trigger frame. For example, the special user information field may be identified by a special AID value that is reserved in the legacy version of the IEEE 802.11 standard. The special AID value may be different than any AID values assigned to wireless communication devices in a BSS associated with the TB PPDU.

Particular implementations of the subject matter described in this disclosure can be implemented to realize one or more of the following potential advantages. By soliciting transmission of non-legacy TB PPDUs, the trigger frame designs of the present disclosure may support gains in data throughput achievable in accordance with the IEEE 802.11be amendment, and future generations, of the IEEE 802.11 standard. As described above, a wireless communication device transmitting a non-legacy TB PPDU needs ensure that one or more fields of the PHY preamble (such as U-SIG) of the TB PPDU are consistent with respective fields of other PPDUs concurrently transmitted on the same (or overlapping) 20 MHz subchannels. By including preamble information in a trigger frame, aspects of the present disclosure may enable the receiving device to configure the U-SIG of the solicited TB PPDU to be consistent with (or identical to) the U-SIG of other PPDUs concurrently transmitted on the same 20 MHz subchannels. By providing the preamble information in a special user information field (associated with a reserved AID value in the legacy version of the IEEE 802.11 standard), the trigger frame designs of the present disclosure may be compatible with legacy and non-legacy versions of the IEEE 802.11 standard.

Figure 9:
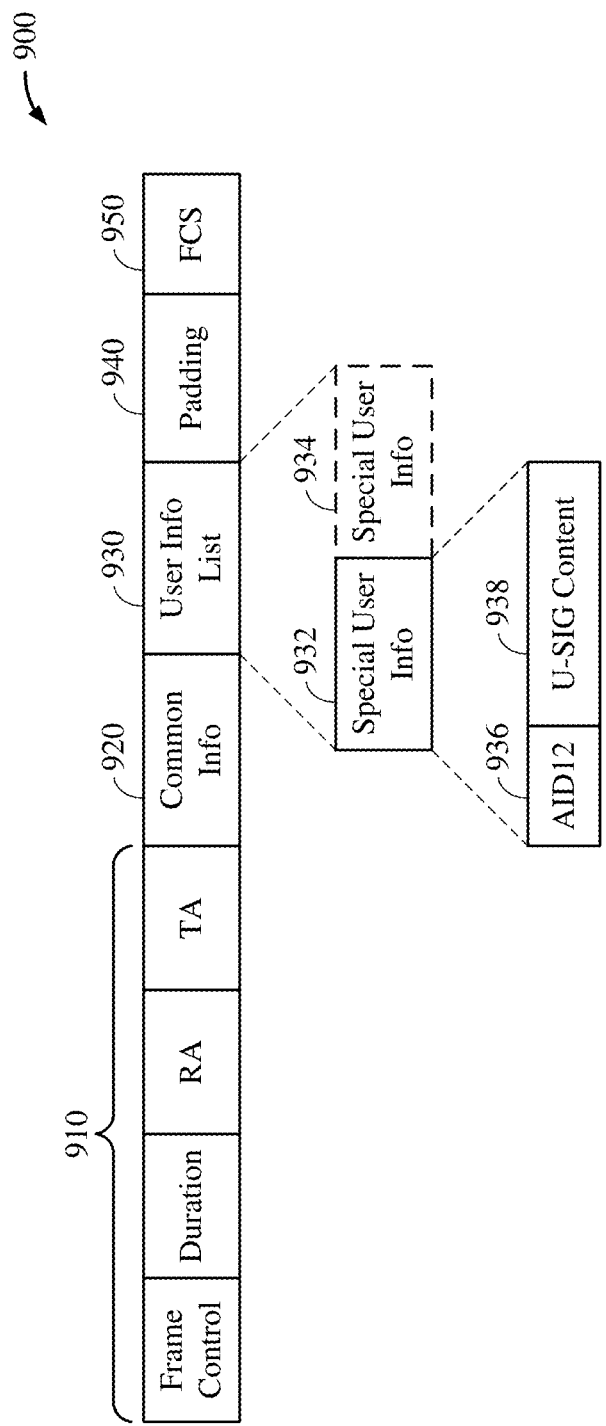
FIG. 9 shows an example trigger frame usable for communications between an AP and a number of STAs according to some implementations.

FIG. 9 shows an example trigger frame 900 usable for communications between an AP and a number of STAs according to some implementations. In some implementations, the trigger frame 900 may be used to solicit TB PPDUs (such as legacy and non-legacy TB PPDUs) from one or more non-legacy STAs. For example, non-legacy TB PPDUs may be formatted according to the format of the TB PPDU 700 of FIG. 7A. In some other implementations, the trigger frame 900 may be used to solicit TB PPDUs from one or more legacy STAs. In other words, the trigger frame 900 may support backwards compatibility with the legacy trigger frame format (such as defined by the IEEE 802.11ax amendment of the IEEE 802.11 standards).

The trigger frame 900 includes a MAC header 910, a common information field 920, a user information list 930, zero or more padding bits 940, and an FCS 950. The MAC header 910 includes a frame control field, a duration field, a receiver address (RA) field, and a transmitter address (TA) field. The common information field 920 and user information list 930 carry configuration information which may be used by a receiving device to configure a TB PPDU to be transmitted in response to receiving the trigger frame 900. More specifically, the user information list 930 may include one or more user information fields each carrying per-user information for a respective user. In contrast, the common information field 920 may carry information that is common to all recipients of the trigger frame 900 (such as any users associated with the user fields in the user information list 930).

In some implementations, the user information list 930 may include a special user information field 932. In some aspects, the special user information field 932 may be the first user information field in a series of user information fields in the user information list 930. The special user information field 932 may carry preamble information to be included in the PHY preamble of the TB PPDU. More specifically, a receiving device may determine how to generate or configure the PHY preamble of the TB PPDU based on the preamble information carried in the special user information field 932. In some implementations, the preamble information may include U-SIG content 938. For example, the U-SIG content 938 may indicate values for one or more subfields of U-SIG in the PHY preamble of the TB PPDU. In some implementations, the special user information field 932 may be associated with a special AID12 value 936. The special AID value may be an AID value that is not assigned to any STAs belonging to the BSS associated with the trigger frame 900. More specifically, non-legacy receiving devices may determine that the special user information field 932 carries U-SIG content 938 based on the special AID value 936.

Figure 10:
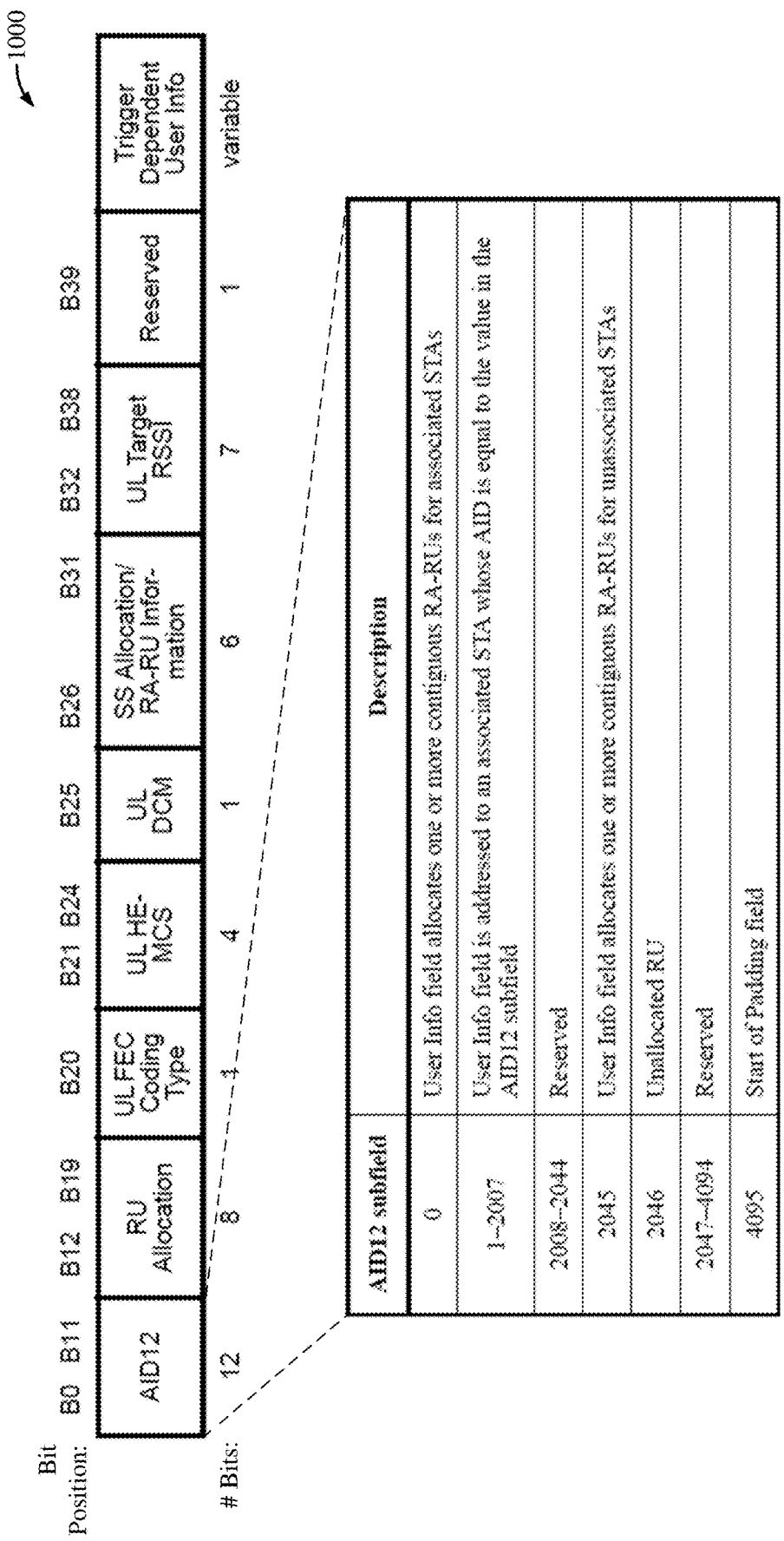
FIG. 10 shows an example user information field for a trigger frame formatted in accordance with a legacy trigger frame format.

FIG. 10 shows an example user information field 1000 for a trigger frame formatted in accordance with the legacy trigger frame format (such as defined by the IEEE 802.11ax amendment of the IEEE 802.11 standard). With reference for example to FIG. 9, the user information field 1000 may be one example of a user information field that can be included in the user information list 930. Each user information field is associated with a respective AID value. The AID value may be a 12-bit value carried in the AID12 subfield (in bit positions B0-B11) of a user information field. In some aspects, the AID value may uniquely identify a particular STA (or user) in a BSS. For example, each STA may be assigned a unique AID value upon associating with the BSS. However, aspects of the present disclosure recognize that several values associated with the AID12 subfield are reserved (such as 2008-2044 and 2047-4094) in the legacy trigger frame format. Thus, in some implementations, the special user information field 932 may be assigned one or more of the reserved values associated with the AID12 subfield. By using a reserved value for its AID12 subfield, the special user information field 932 may be ignored by legacy STAs and interpreted by non-legacy STAs.

As shown in FIG. 10, each user information field is 40 bits in length. When the AID12 subfield is set to a special AID value, the remaining 28 bits of the user information field (in bit positions B12-B39) may be repurposed to carry preamble information (such as U-SIG content 938). In some implementations, the user information list 930 may include one or more additional special user information fields 934, for example, to carry additional preamble information or other information to be signaled to the receiving device. In some implementations, the special user information fields 932 and 934 may be associated with different releases or versions of a physical layer wireless communication protocol. In other words, the format or contents of special user information field 932 may differ from the format or contents of special user information field 934. Thus, the trigger frame 900 may carry preamble information for multiple releases or versions of the IEEE 802.11 standard. In some implementations, the different releases or versions may be associated with different special AID values. In some other implementations, all special user information fields may be associated with the same special AID value. In such implementations, the different releases or versions may be indicated by other information in the special user information field.

Figure 11A:
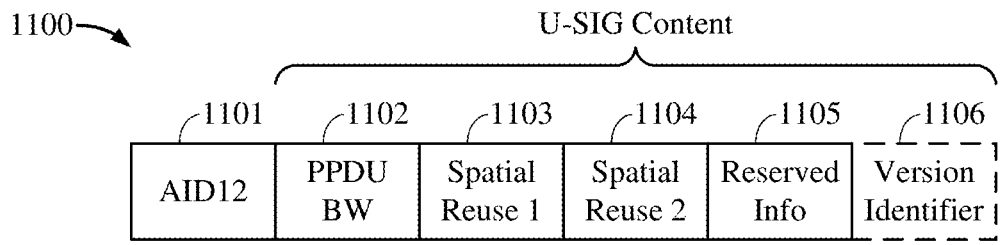
FIGS. 11A-11C show example special user information fields according to some implementations.

FIG. 11A shows an example special user information field 1100 according to some implementations. In some implementations, the special user information field 1100 may be one example of the special user information field 932 of FIG. 9. Accordingly, the special user information field 1100 may be configured to carry preamble information for a TB PPDU. The special user information field 1100 includes an AID12 subfield 1101 and a number of U-SIG content subfields 1102-1105. In some implementations, the AID12 subfield 1101 may be assigned a special AID value (such as one of the reserved AID values in FIG. 10). As described with reference to FIGS. 9 and 10, the special AID value is not assigned to any STAs belonging to the BSS associated with the underlying trigger frame. In some implementations, the U-SIG content subfields 1102-1105 may carry preamble information to be included in the U-SIG of the TB PPDU solicited by the trigger frame.

In the example of FIG. 11A, the U-SIG content subfields 1102-1105 include a PPDU BW subfield 1102, a first spatial reuse (spatial reuse 1) subfield 1103, a second spatial reuse (spatial reuse 2) subfield 1104, and a reserved information subfield 1105. With reference for example to Table 1, the PPDU BW subfield 1102, first spatial reuse subfield 1103, and second spatial reuse subfield 1104 may carry information to be included in the PPDU BW subfield, spatial reuse 1 subfield, and spatial reuse 2 subfield, respectively, of the U-SIG. For example, the PPDU BW subfield 1102 may carry information indicating a bandwidth of the wireless channel over which the TB PPDU is to be transmitted, and the spatial reuse subfields 1103 and 1104 may carry information indicating whether spatial reuse is permitted on one or more subchannels of the wireless channel. In some implementations, the reserved information subfield 1105 may carry information indicating a number (and location) of reserved bits to be included in U-SIG.

In some implementations, the special user information field 1100 may further include a version identifier subfield 1106. With reference for example to Table 1, the version identifier subfield 1106 may carry information to be included in the version identifier subfield of U-SIG. For example, the version identifier subfield 1106 may carry information indicating version of a physical layer wireless communication protocol associated with the TB PPDU. In some other implementations, the version information may be associated with the value of the AID12 subfield 1101. For example, as described with reference to FIG. 9, different versions of the IEEE 802.11 standard may be associated with different special AID values. In such implementations, the version identifier subfield 1106 may be absent or omitted from the special user information field 1100. For example, a receiving device may determine the version information (that would otherwise be carried in the version identifier subfield 1106) based on the value of the AID12 subfield 1101.

In some implementations, when generating the PHY preamble of the TB PPDU, a receiving device may copy the information from the U-SIG content subfields 1102, 1103, 1104, 1105, or 1106, into respective subfields of U-SIG. In other words, the values of each of the subfields 1102-1106 may be identical to the values to be conveyed by the respective subfields of U-SIG. With reference for example to Table 1, the PPDU BW subfield 1102 may carry 3 bits of information, each of the spatial reuse subfields 1103 and 1104 may carry 4 bits of information, the reserved information subfield 1105 may carry up to 12 bits of information, and the version identifier subfield 1106 may carry 3 bits of information. In such implementations, a total of 26 bits are needed to convey the information in each of the U-SIG content subfields 1102-1106 (or a total of 23 bits for implementations in which the version identifier subfield 1106 is omitted), which is less than the 28 available bits in the special user information field 1100.

Aspects of the present disclosure recognize that the information associated one or more subfields of U-SIG can be derived locally by the receiving device. With reference for example to Table 1, the values of the UL/DL subfield, the BSS color subfield, the TXOP subfield, and the PPDU format and EHT-SIG compression subfield can be set by the receiving device based on known parameters associated with the TB PPDU. Further, the CRC and tail bits are derived based on the contents of the TB PPDU. Thus, in some implementations, a trigger frame may not carry preamble information that can be derived locally by the receiving device. More specifically, in some aspects, the values for the UL/DL subfield, the BSS color subfield, the TXOP subfield, and PPDU format and EHT-SIG compression subfield may be omitted from the trigger frame.

Aspects of the present disclosure also recognize that the potential for errors is greater when deriving the preamble information locally compared to copying the preamble information directly from the trigger frame. Thus, in some other implementations, a trigger frame may carry the preamble information to be included in each subfield of U-SIG (including values for subfields that can otherwise be derived locally by the receiving device). With reference for example to Table 1, a total of 16 bits are needed to convey the values of the UL/DL subfield, the BSS color subfield, the TXOP subfield, and the PPDU format and EHT-SIG compression subfield, which exceeds the number of available bits remaining in the special user information field 1100. Thus, in some aspects, the preamble information associated with one or more of these subfields may be carried in an additional special user information field.

Figure 11B:
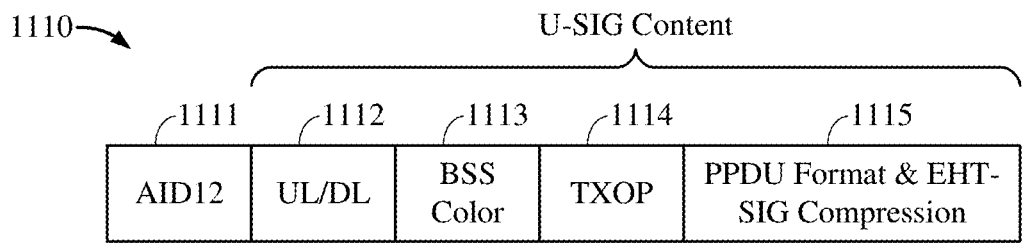

FIG. 11B shows another example special user information field 1110 according to some implementations. In some implementations, the special user information field 1110 may be one example of the special user information field 932 of FIG. 9. Accordingly, the special user information field 1110 may be configured to carry preamble information for a TB PPDU. The special user information field 1110 includes an AID12 subfield 1111 and a number of U-SIG content subfields 1112-1115. In some implementations, the AID12 subfield 1111 may be assigned a special AID value (such as one of the reserved AID values in FIG. 10). As described with reference to FIGS. 9 and 10, the special AID value is not assigned to any STAs belonging to the BSS associated with the underlying trigger frame. In some implementations, the U-SIG content subfields 1112-1115 may carry preamble information to be included in the U-SIG of the TB PPDU solicited by the trigger frame.

In the example of FIG. 11B, the U-SIG content subfields 1112-1115 include a UL/DL subfield 1112, a BSS color subfield 1113, a TXOP subfield 1114, and a PPDU format and EHT-SIG compression subfield 1115. With reference for example to Table 1, the UL/DL subfield 1112, BSS color subfield 1113, TXOP subfield 1114, and PPDU format and EHT-SIG compression subfield 1115 may carry information to be included in the UL/DL subfield, BSS color subfield, TXOP subfield, and PPDU format and EHT-SIG compression subfield, respectively, of the U-SIG. For example, the UL/DL subfield 1112 may carry information indicating whether the TB PPDU is transmitted in the uplink or the downlink direction, the BSS color subfield 1113 may carry information indicating a BSS color (which identifies the BSS) associated with the TB PPDU, the TXOP subfield 114 may carry information indicating a TXOP duration associated with the TB PPDU, and the PPDU format and EHT-SIG compression subfield 1115 may carry information indicating a format of the PPDU.

In some implementations, when generating the PHY preamble of the TB PPDU, a receiving device may copy the information from the U-SIG content subfields 1112-1115 into respective subfields of U-SIG. In other words, the values of each of the subfields 1112-1115 may be identical to the values to be conveyed by the respective subfields of U-SIG. With reference for example to Table 1, the UL/DL subfield 1112 may carry 1 bit of information, the BSS color subfield 1113 may carry 6 bits of information, the TXOP subfield 114 may carry 7 bits of information, and the PPDU format and EHT-SIG compression subfield 1115 may carry 2 bits of information. In such implementations, a total of 16 bits are needed to convey the information in each of the U-SIG content subfields 1112-1115, which is substantially less than the 28 available bits in the special user information field 1110.

In some implementations, one or more of the subfields 1112-1115 may be added to the U-SIG content subfields of the special user information field 1100 of FIG. 11A. Similarly, one or more of the subfields 1102-1106 may be added to the U-SIG content subfields of the special user information field 1110. For example, this may free up additional unused bits in one of the special user information fields 1100 or 1110. In some implementations, the unused bits in one or more of the special user information fields 1100 or 1110 may be repurposed to carry additional information that may be relevant to the transmission of the TB PPDU or other communications involving the receiving device. In some other implementations, such additional information may be carried in one or more additional special user information fields.

In some implementations, a wireless channel may be punctured to exclude one or more subchannels from the transmission of a PPDU, for example, to avoid interference (such as from an incumbent system transmission) on the punctured subchannels. More specifically, channel puncturing may be specified at a 20 MHz granularity. With reference for example to FIG. 8, channel puncturing information may indicate which (if any) of the $1^{st}$, $2^{nd}$, $3^{rd}$, $4^{th}$, $5^{th}$, $6^{th}$, $7^{th}$, $8^{th}$, $9^{th}$, $10^{th}$, $11^{th}$, $12^{th}$, $13^{th}$, $14^{th}$, $15^{th}$, or $16^{th}$ 20 MHz subchannels of a 320 MHz wireless channel is punctured. In some implementations, a trigger frame may further carry channel puncturing information, for example, to support such punctured channel indications. In some aspects, the channel puncturing information may be carried in a special user information field that also includes one or more U-SIG content subfields. In some other aspects, the channel puncturing information may be carried in a separate special user information field that does not carry preamble information.

Figure 11C:
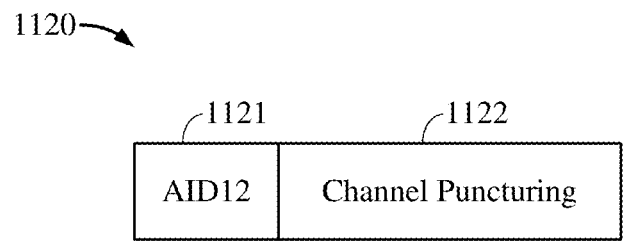

FIG. 11C shows another example special user information field 1120 according to some implementations. In some implementations, the special user information field 1120 may be one example of the special user information field 932 of FIG. 9. However, unlike the special user information fields 1100 and 1110 of FIGS. 11A and 11B, respectively, the special user information field 1120 may not be configured to carry preamble information for a TB PPDU. The special user information field 1120 includes an AID12 subfield 1121 and a channel puncturing subfield 1122. In some implementations, the AID12 subfield 1121 may be assigned a special AID value (such as one of the reserved AID values in FIG. 10). As described with reference to FIGS. 9 and 10, the special AID value is not assigned to any STAs belonging to the BSS associated with the underlying trigger frame.

The channel puncturing subfield 1122 may carry channel puncturing information associated with the wireless channel on which a TB PPDU (solicited by the trigger frame) is to be transmitted. In some implementations, the channel puncturing information may be represented by a 16-bit bitmap. For example, each bit of the 16-bit bitmap may be associated with a respective 20 MHz subchannel of a 320 MHz wireless channel. More specifically, the value of each bit of the 16-bit bitmap may indicate whether puncturing is performed on the respective 20 MHz subchannel. With reference for example to FIG. 8, the 16-bit bitmap may indicate which (if any) of the $1^{st}$, $2^{nd}$, $3^{rd}$, $4^{th}$, $5^{th}$, $6^{th}$, $7^{th}$, $8^{th}$, $9^{th}$, $10^{th}$, $11^{th}$, $12^{th}$, $13^{th}$, $14^{th}$, $15^{th}$, or $16^{th}$ 20 MHz subchannels of the 320 MHz wireless channel is punctured.

In some implementations, the channel puncturing information may be condensed or compressed to reduce overhead. In some other implementations, the channel puncturing information may be represented by an 8-bit bitmap plus a resolution bit. For example, the value of each bit of the 8-bit bitmap may indicate whether puncturing is performed on a respective subchannel of the wireless channel. The value of the resolution bit may indicate whether each bit of the 8-bit bitmap is associated with a respective 20 MHz subchannel (such as for an 80 MHz wireless channel or segment) or a respective 40 MHz subchannel (such as for a 320 MHz wireless channel).

Figure 12:
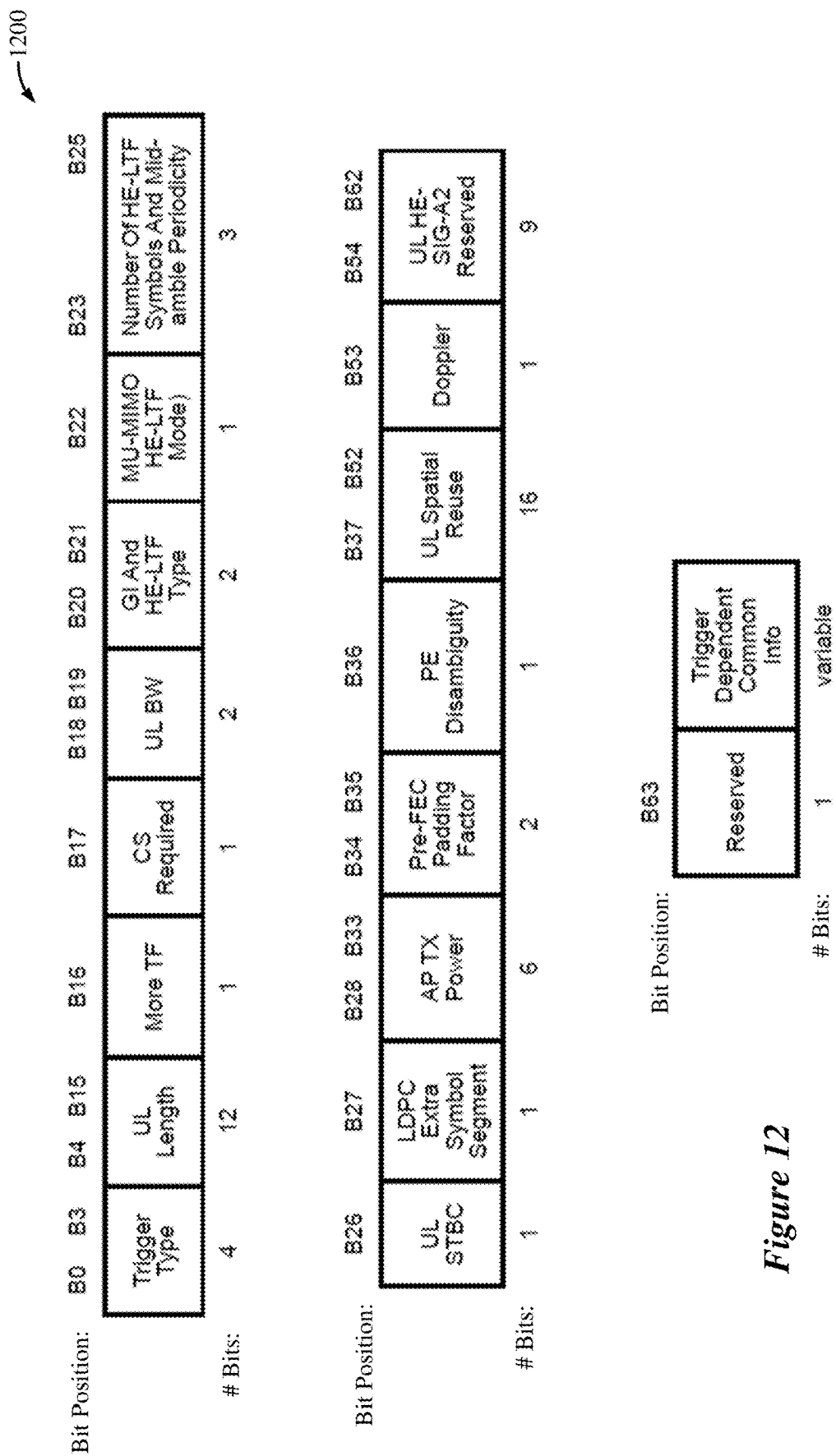
FIG. 12 shows a common information field for a trigger frame formatted in accordance with a legacy trigger frame format.

Aspects of the present disclosure further recognize that, by reducing the size of the bitmap, the channel puncturing information may be carried in other fields of the trigger frame such as, for example, the common information field. FIG. 12 shows an example common information field 1200 for a trigger frame formatted in accordance with the legacy trigger frame format (such as defined by the IEEE 802.11ax amendment of the IEEE 802.11 standard). With reference for example to FIG. 9, the common field 1200 may be one example of the common field 920. As shown in FIG. 12, the common field 1200 includes a total of 10 reserved bits (in bit positions B54-B63). In some implementations, 9 of these reserved bits may be repurposed to carry channel puncturing information (such as an 8-bit bitmap plus a resolution bit).

Figure 13:
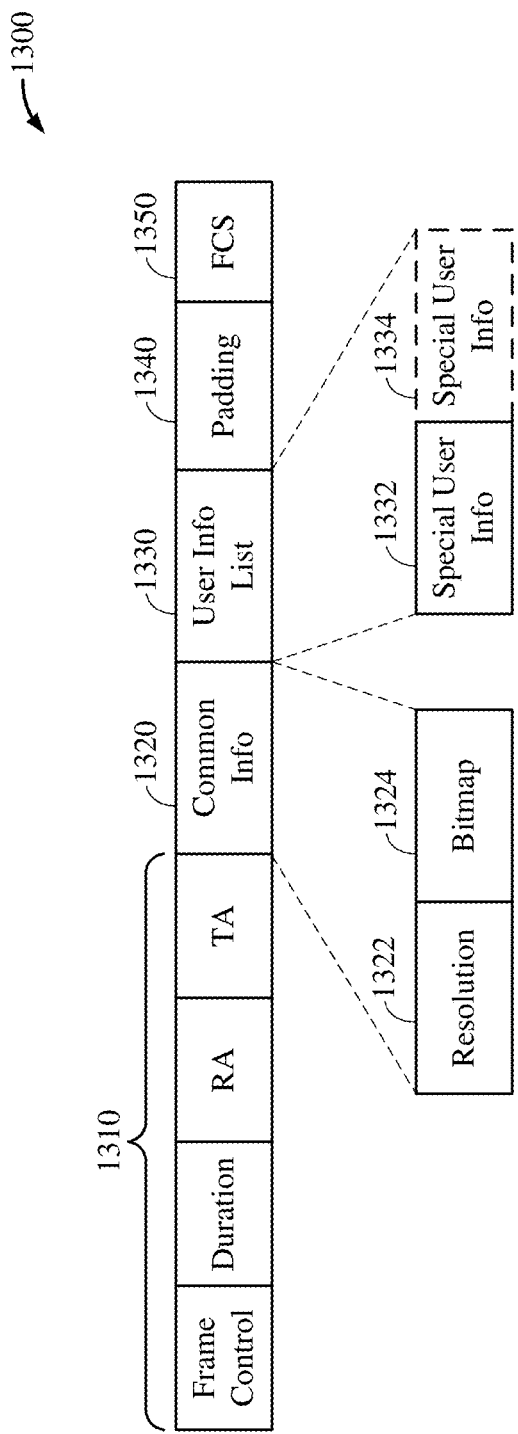
FIG. 13 shows another example trigger frame usable for communications between an AP and a number of STAs according to some implementations.

FIG. 13 shows another example trigger frame 1300 usable for communications between an AP and a number of STAs according to some implementations. In some implementations, the trigger frame 1300 may be one example of the trigger frame 900 of FIG. 9. In some aspects, the trigger frame 1300 may be used to solicit TB PPDUs (such as legacy or non-legacy TB PPDUs) from one or more non-legacy STAs. In some other aspects, the trigger frame 1300 may be used to solicit TB PPDUs from one or more legacy STAs.

The trigger frame 1300 includes a MAC header 1310, a common information field 1320, a user information list 1330, zero or more padding bits 1340, and an FCS 1350. The MAC header 1310 includes a frame control field, a duration field, an RA field, and a TA field. The common information field 1320 and user information list 1330 carry configuration information which may be used by a receiving device to configure a TB PPDU to be transmitted in response to receiving the trigger frame 1300. More specifically, the user information list 1330 may include one or more user information fields each carrying per-user information for a respective user. In contrast, the common information field 1320 may carry information that is common to all recipients of the trigger frame 1300 (such as any users associated with the user fields in the user information list 1330).

In some implementations, the common information field 1320 may carry channel puncturing information represented by a resolution bit 1322 and a bitmap 1324. The bitmap 1324 may indicate whether puncturing is performed on one or more subchannels of a wireless channel on which the TB PPDU is to be transmitted. In some implementations, the bitmap 1324 may be an 8-bit bitmap. As described above, the value of each bit of the 8-bit bitmap may indicate whether puncturing is performed on a respective subchannel of the wireless channel. The value of the resolution bit 1322 may indicate whether each bit of the 8-bit bitmap is associated with a respective 20 MHz subchannel or a respective 40 MHz subchannel. In some implementations, the resolution bit 1322 and bitmap 1324 may represent 9 reserved bits in the common information field associated with the legacy trigger frame format (such as any of the reserved bits in bit positions B54-B63 of the common information field 1200).

In some implementations, the user information list 1330 may include one or more special user information fields 1332 or 1334. In some implementations, the special user information fields 1332 and 1334 may be examples of the special user information fields 932 and 934, respectively, of FIG. 9. For example, at least one of the special user information field 1332 or 1334 may be configured to carry preamble information to be included in the PHY preamble of the TB PPDU. More specifically, a receiving device may determine how to generate or configure the PHY preamble of the TB PPDU based on the preamble information carried in the special user information fields 1332 or 1334. As described with reference to FIGS. 9 and 10, each of the special user information field 1332 and 1334 may be associated with a special AID12 value. The special AID value may be an AID value that is not assigned to any STAs belonging to the BSS associated with the trigger frame 1300.

By repurposing reserved bits in the common information field 1320 to carry channel puncturing information, aspects of the present disclosure may reduce the overhead associated with the trigger frame 1300. With reference for example to FIGS. 11A-11C, the user information list 1330 may include at least one less special user information field that would otherwise be used to carry the channel puncturing information (such as the special user information field 1120 of FIG. 11C). In some other implementations, the common information field of a trigger frame may be configured to carry enhanced signaling associated with one or more user information fields of a user information list. In some aspects, the enhanced signaling may indicate a presence or availability of special user information fields in the user information list (such as described with reference to FIG. 14). In some other aspects, the enhanced signaling may indicate a version of a physical layer wireless communication protocol associated with each user information field in the user information list (such as described with reference to FIG. 15).

Figure 14:
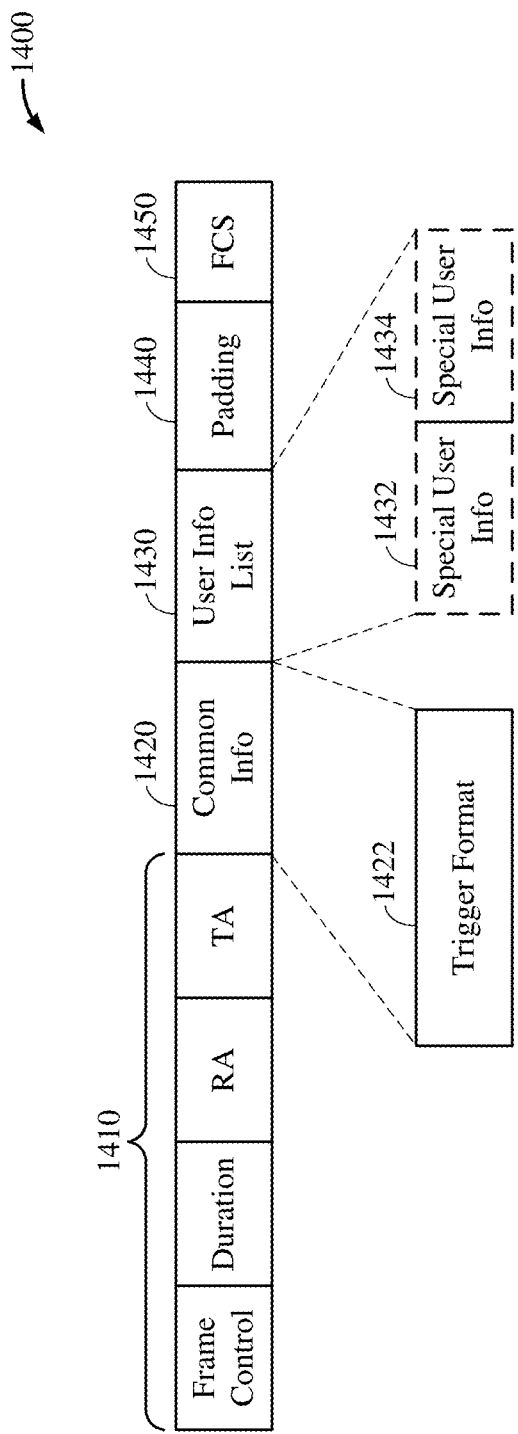
FIG. 14 shows another example trigger frame usable for communications between an AP and a number of STAs according to some implementations.

FIG. 14 shows another example trigger frame 1400 usable for communications between an AP and a number of STAs according to some implementations. In some implementations, the trigger frame 1400 may be one example of the trigger frame 900 of FIG. 9. In some aspects, the trigger frame 1400 may be used to solicit TB PPDUs (such as legacy or non-legacy TB PPDUs) from one or more non-legacy STAs. In some other aspects, the trigger frame 1400 may be used to solicit TB PPDUs from one or more legacy STAs.

The trigger frame 1400 includes a MAC header 1410, a common information field 1420, a user information list 1430, zero or more padding bits 1440, and an FCS 1450. The MAC header 1410 includes a frame control field, a duration field, an RA field, and a TA field. The common information field 1420 and user information list 1430 carry configuration information which may be used by a receiving device to configure a TB PPDU to be transmitted in response to receiving the trigger frame 1400. More specifically, the user information list 1430 may include one or more user information fields each carrying per-user information for a respective user. In contrast, the common information field 1420 may carry information that is common to all recipients of the trigger frame 1400 (such as any users associated with the user fields in the user information list 1430).

In some implementations, the common information field 1420 may carry trigger format information 1422 indicating a format of the trigger frame 1400. More specifically, The trigger format information 1422 may include one or more bits indicating whether the trigger frame 1400 is configured in accordance with a legacy trigger frame format or a non-legacy trigger frame format. In some implementations, the trigger format information 1422 may replace one or more reserved bits in the common information field associated with the legacy trigger frame format (such as any of the reserved bits in bit positions B54-B63 of the common information field 1200).

In some aspects, when the trigger format information 1422 indicates the legacy trigger frame format, the fields and subfields of the trigger frame 1400 may be identical to the fields and subfields of the trigger frame format defined by the IEEE 802.11ax amendment of the IEEE 802.11 standard. For example, in such configurations, the user information list 1430 may not include any special user information fields. In some other aspects, when the trigger format information 1422 indicates the non-legacy trigger frame format, the trigger frame 1400 may include one or more new (or modified) fields or subfields that support enhanced WLAN communication features such as provided by the IEEE 802.11be amendment, and future generations, of the IEEE 802.11 standard. For example, in such configurations, the user information list 1430 may include one or more special user information fields.

In some implementations, the user information list 1430 may include one or more special user information fields 1432 or 1434. In some implementations, the special user information fields 1432 and 1434 may be examples of the special user information fields 932 and 934, respectively, of FIG. 9. For example, at least one of the special user information field 1432 or 1434 may be configured to carry preamble information to be included in the PHY preamble of the TB PPDU. More specifically, a receiving device may determine how to generate or configure the PHY preamble of the TB PPDU based on the preamble information carried in the special user information fields 1432 or 1434. As described with reference to FIGS. 9 and 10, each of the special user information field 1432 and 1434 may be associated with a special AID12 value. The special AID value may be an AID value that is not assigned to any STAs belonging to the BSS associated with the trigger frame 1400.

In some implementations, a receiving device that receives the trigger frame 1400 may determine, based on the trigger format information 1422 whether to look for special user information fields 1432 or 1434 in the user information list 1430. For example, if the trigger format information 1422 indicates the non-legacy trigger frame format, the receiving device may compare the AID value associated with each user information field in the user information list 1430 with one or more special AID values to identify special user information fields. On the other hand, if the trigger format information 1422 indicates the legacy trigger frame format, the receiving device does not need to compare the special AID values to the AID values associated with each user information field in the user information list 1430, which may reduce the processing overhead of the receiving device.

Figure 15:
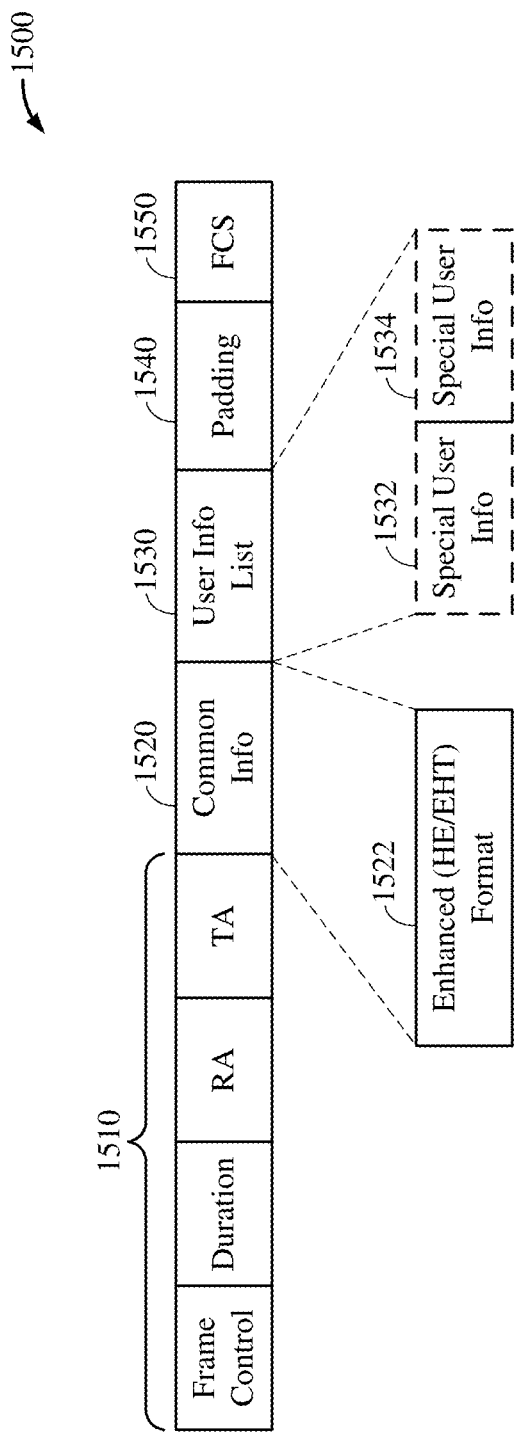
FIG. 15 shows another example trigger frame usable for communications between an AP and a number of STAs according to some implementations.

FIG. 15 shows another example trigger frame 1500 usable for communications between an AP and a number of STAs according to some implementations. In some implementations, the trigger frame 1500 may be one example of the trigger frame 900 of FIG. 9. In some aspects, the trigger frame 1500 may be used to solicit TB PPDUs (such as legacy or non-legacy TB PPDUs) from one or more non-legacy STAs. In some other aspects, the trigger frame 1500 may be used to solicit TB PPDUs from one or more legacy STAs.

The trigger frame 1500 includes a MAC header 1510, a common information field 1520, a user information list 1530, zero or more padding bits 1540, and an FCS 1550. The MAC header 1510 includes a frame control field, a duration field, an RA field, and a TA field. The common information field 1520 and user information list 1530 carry configuration information which may be used by a receiving device to configure a TB PPDU to be transmitted in response to receiving the trigger frame 1500. More specifically, the user information list 1530 may include one or more user information fields each carrying per-user information for a respective user. In contrast, the common information field 1520 may carry information that is common to all recipients of the trigger frame 1500 (such as any users associated with the user fields in the user information list 1530).

In some implementations, the common information field 1520 may include an enhanced (HE/EHT) format indication 1522 indicating a version of a physical layer wireless communication protocol associated with the user information list 1530. More specifically, the enhanced format indication 1522 may include one or more bits indicating whether the user information fields in the user information list 1530 are associated with a legacy PPDU format or a non-legacy PPDU format. In some implementations, the enhanced format indication 1522 may replace one or more reserved bits in the common information field associated with the legacy trigger frame format (such as any of the reserved bits in bit positions B54-B63 of the common information field 1200).

In some aspects, when the enhanced format indication 1522 indicates the legacy PPDU format, each user information field of the user information list 1530 may be associated with the legacy PPDU format. More specifically, in such configurations, the trigger frame 1500 may solicit legacy TB PPDUs to be transmitted by each user associated with a respective user information field of the user information list 1530. In some other aspects, when the enhanced format indication 1522 indicates the non-legacy PPDU format, each user information field of the user information list 1530 may be associated with the non-legacy PPDU format. More specifically, in such configurations, the trigger frame 1500 may solicit non-legacy TB PPDUs to be transmitted by each user associated with a respective user information field of the user information list 1530.

In some implementations, the user information list 1530 may include one or more special user information fields 1532 or 1534. In some implementations, the special user information fields 1532 and 1534 may be examples of the special user information fields 932 and 934, respectively, of FIG. 9. For example, at least one of the special user information field 1532 or 1534 may be configured to carry preamble information to be included in the PHY preamble of the TB PPDU. More specifically, a receiving device may determine how to generate or configure the PHY preamble of the TB PPDU based on the preamble information carried in the special user information fields 1532 or 1534. As described with reference to FIGS. 9 and 10, each of the special user information field 1532 and 1534 may be associated with a special AID12 value. The special AID value may be an AID value that is not assigned to any STAs belonging to the BSS associated with the trigger frame 1500.

In some implementations, a receiving device that receives the trigger frame 1500 may determine, based on the enhanced format indication 1522 whether to interpret or process the information carried in the user information fields in accordance with legacy or non-legacy versions of the physical layer wireless communication protocol. For example, if the enhanced format indication 1522 indicates the legacy PPDU format, the receiving device may interpret the information in its user information field in accordance with the IEEE 802.11ax amendment of the IEEE 802.11 standard, and may transmit a legacy TB PPDU in response to receiving the trigger frame 1500. On the other hand, if the enhanced format indication 1522 indicates the non-legacy PPDU format, the receiving device may interpret the information in its user information field in accordance with the IEEE 802.11be amendment, or future generations, of the IEEE 802.11 standard, and may transmit a non-legacy TB PPDU in response to receiving the trigger frame 1500.

In some other implementations, the presence (or absence) of a special user information field in the user information list 1530 may signal that each user information field of the user information list 1530 is associated with the non-legacy PPDU format (or the legacy PPDU format). In some aspects, a receiving device may look for one or more special user information fields in the user information list 1530 to determine whether to interpret or process the information carried in the user information fields in accordance with legacy or non-legacy versions of the physical layer wireless communication protocol. For example, if the user information list 1530 does not include a special user information field, the receiving device may interpret the information in its user information field in accordance with the IEEE 802.11ax amendment of the IEEE 802.11 standard, and may transmit a legacy TB PPDU in response to receiving the trigger frame 1500. On the other hand, if the user information list 1530 includes one or more special user information fields 1532 or 1534, the receiving device may interpret the information in its user information field in accordance with the IEEE 802.11be amendment, or future generations, of the IEEE 802.11 standard, and may transmit a non-legacy TB PPDU in response to receiving the trigger frame 1500.

Figure 16:
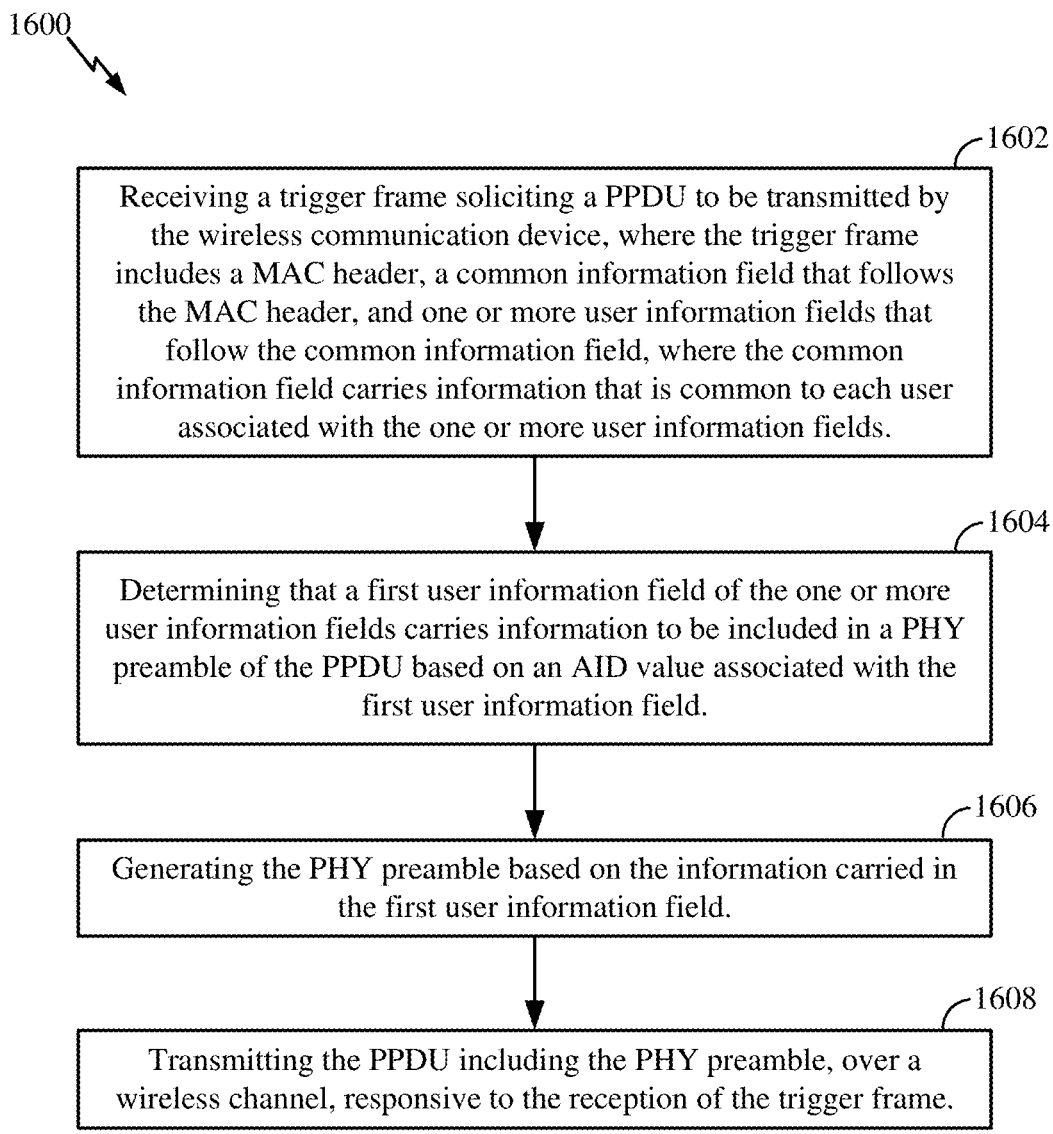
FIG. 16 shows a flowchart illustrating an example process for wireless communication that supports special user information fields for trigger frames according to some implementations.

FIG. 16 shows a flowchart illustrating an example process 1600 for wireless communication that supports special user information fields for trigger frames according to some implementations. In some implementations, the process 1600 may be performed by a wireless communication device operating as or within a network node, such as one of the STAs 104 or 504 described above with reference to FIGS. 1 and 5B, respectively.

In some implementations, the process 1600 begins in block 1602 with receiving a trigger frame soliciting a PPDU to be transmitted by the wireless communication device, where the trigger frame includes a MAC header, a common information field that follows the MAC header, and one or more user information fields that follow the common information field, where the common information field carries information that is common to each user associated with the one or more user information fields. In block 1604, the process 1600 proceeds with determining that a first user information field of the one or more user information fields carries information to be included in a PHY preamble of the PPDU based on an AID value associated with the first user information field. In block 1606, the process 1600 proceeds with generating the PHY preamble based on the information carried in the first user information field. In block 1608, the process 1600 proceeds with transmitting the PPDU including the PHY preamble, over a wireless channel, responsive to the reception of the trigger frame.

In some implementations, the AID value may be a special AID value not assigned to any wireless communication devices associated with the same BSS as the wireless communication device.

In some implementations, the process 1600 may proceed, after the reception of the trigger frame in block 1602 and before the generating of the PHY preamble in block 1606, by determining that a second user information field of the one or more user information fields carries additional information to be included in the PHY preamble based on an AID value associated with the second user information field.

In some implementations, the PHY preamble may include an L-SIG, an RL-SIG that immediately follows L-SIG, and a U-SIG that immediately follows RL-SIG and carries information for interpreting one or more subsequent fields of the PHY preamble.

In some implementations, the operation for generating the PHY preamble, in block 1606, may include determining values for one or more subfields of U-SIG based on the information carried in the first user information field, where the one or more subfields includes at least one of a PPDU bandwidth subfield that carries information indicating a bandwidth of the wireless channel, a spatial reuse subfield that carries information indicating whether spatial reuse is permitted on one or more subchannels of the wireless channel, or a version identifier subfield that carries information indicating a version of a physical layer wireless communication protocol associated with the PPDU.

In some implementations, the operation for generating the PHY preamble, in block 1606, may include determining values for one or more subfields of U-SIG based on the information carried in the first user information field, where the one or more subfields including at least one of a UL/DL subfield that carries information indicating whether the PPDU is transmitted in the uplink or the downlink direction, a BSS color subfield that carries information indicating a BSS color associated with the PPDU, a TXOP subfield that carries information indicating a TXOP duration associated with the PPDU, or a PPDU format and compression mode subfield that carries information indicating a format of the PPDU.

In some implementations, the operation for generating the PHY preamble in block 1606 includes determining a number of reserved bits to be included in U-SIG based on the information carried in the first user information field.

In some implementations, the process 1600 may proceed, after the reception of the trigger frame in block 1602 and before the transmission of the PPDU in block 1608, by determining a version of a physical layer wireless communication protocol associated with the PPDU based on the AID value associated with the first user information field; and configuring a version identifier subfield of U-SIG to carry information indicating the determined version of the physical layer wireless communication protocol.

In some implementations, the process 1600 may proceed, after the reception of the trigger frame in block 1602, by determining whether puncturing is to be performed on one or more subchannels of the wireless channel based on the information carried in the first user information field or information carried in the common information field.

In some implementations, the process 1600 may proceed, after the reception of the trigger frame in block 1602 and before the determination that the first user information field carries information to be included in the PHY preamble of the PPDU in block 1604, by determining a format of the trigger frame based on information carried in the common information field, where the format is a legacy trigger frame format or a non-legacy trigger frame format; and determining that the one or more user information fields includes the first user information field based on the determined format of the trigger frame.

In some implementations, the process 1600 may proceed, after the determination that the first user information field carries information to be included in the PHY preamble of the PPDU in block 1604 and before the generation of the PHY preamble in block 1606, by determining a version of a physical layer wireless communication protocol associated with the one or more user information fields based on information carried in at least one of the common information field or the first user information field, where the version of the physical layer wireless communication protocol is the same for each of the one or more user information fields; and interpreting the information carried in the first user information field based on the determined PHY version.

Figure 17:
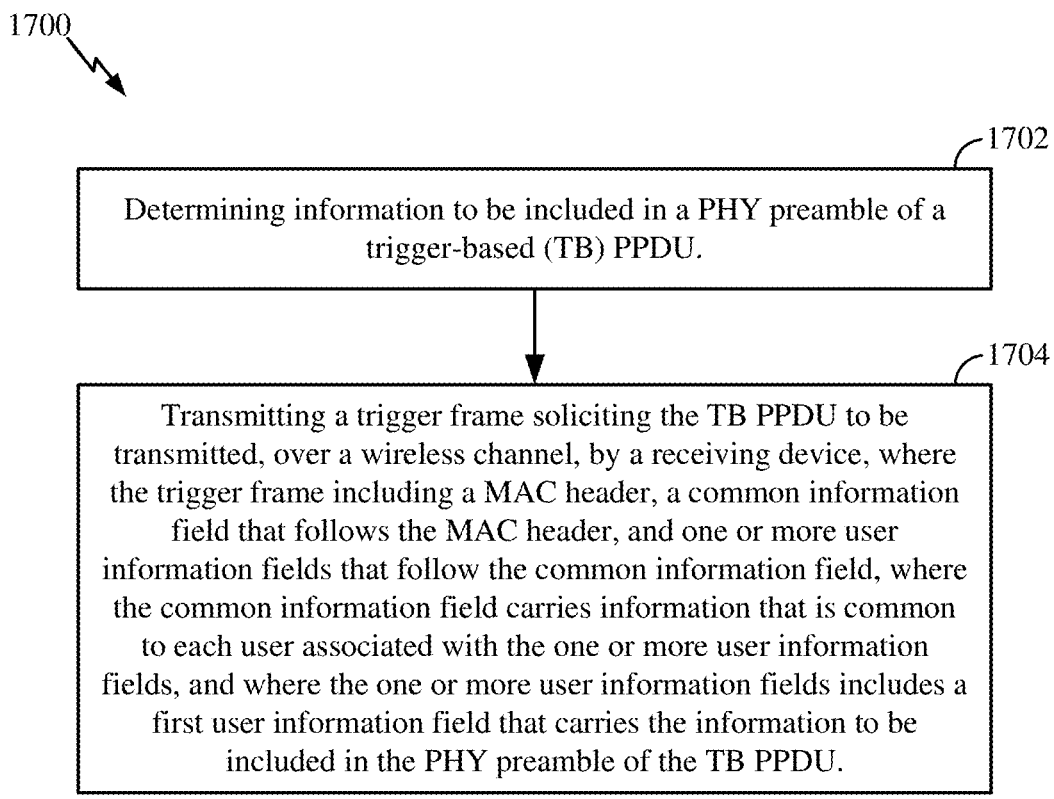
FIG. 17 shows a flowchart illustrating an example process for wireless communication that supports special user information fields for trigger frames according to some implementations.

FIG. 17 shows a flowchart illustrating an example process 1700 for wireless communication that supports special user information fields for trigger frames according to some implementations. In some implementations, the process 1600 may be performed by a wireless communication device operating as or within a network node, such as one of the STAs 104 or 504 described above with reference to FIGS. 1 and 5B, respectively.

In some implementations, the process 1700 begins in block 1702 with determining information to be included in a PHY preamble of a TB PPDU. In block 1704, the process 1700 proceeds with transmitting a trigger frame soliciting the TB PPDU to be transmitted, over a wireless channel, by a receiving device, where the trigger frame including a MAC header, a common information field that follows the MAC header, and one or more user information fields that follow the common information field, where the common information field carries information that is common to each user associated with the one or more user information fields, and where the one or more user information fields includes a first user information field that carries the information to be included in the PHY preamble of the TB PPDU.

In some implementations, the first user information field may be associated with a special AID value not assigned to any wireless communication devices associated with the same BSS as the receiving device. In some implementations, the process 1700 may proceed, after the determination of the information to be included in the PHY preamble in block 1702 and before the transmission of the trigger frame in block 1704, by determining the special AID value based on a version of a physical layer wireless communication protocol associated with the TB PPDU.

In some implementations, the one or more user information fields may further include a second user information field that carries additional information to be included in the PHY preamble.

In some implementations, the PHY preamble may include an L-SIG, an RL-SIG that immediately follows L-SIG, and a U-SIG that immediately follows RL-SIG and carries information for interpreting one or more subsequent fields of the PHY preamble.

In some implementations, the information carried in the first user information field may indicate values for one or more subfields of U-SIG, where the one or more subfields includes at least one of a PPDU bandwidth subfield that carries information indicating a bandwidth of the wireless channel, a spatial reuse subfield that carries information indicating whether spatial reuse is permitted on one or more subchannels of the wireless channel, or a version identifier subfield that carries information indicating a version of a physical layer wireless communication protocol associated with the PPDU.

In some implementations, the information carried in the first user information field may indicate values for one or more subfields of U-SIG, where the one or more subfields includes at least one of a UL/DL subfield that carries information indicating whether the PPDU is transmitted in the uplink or the downlink direction, a BSS color subfield that carries information indicating a BSS color associated with the PPDU, a TXOP subfield that carries information indicating a TXOP duration associated with the PPDU, or a PPDU format and compression mode subfield that carries information indicating a format of the PPDU.

In some implementations, the information carried in the first user information field may indicate a number of reserved bits to be included in U-SIG.

In some implementations, the process 1700 may proceed, after the determination of the information to be included in the PHY preamble in block 1702 and before the transmission of the trigger frame in block 1704, by determining whether puncturing is to be performed on one or more subchannels of the wireless channel, where at least one of the common information field or the first user information field carries channel puncturing information indicating whether puncturing is to be performed on the one or more subchannel.

In some implementations, the common information field may carry information indicating a format of the trigger frame, where the format is a legacy trigger frame format or a non-legacy trigger frame format.

In some implementations, at least one of the common information field or the first user information field may further carry information indicating a version of a physical layer wireless communication protocol associated with the one or more user information fields, where the version of the physical layer wireless communication protocol is the same for each of the one or more user information fields.

Figure 18:
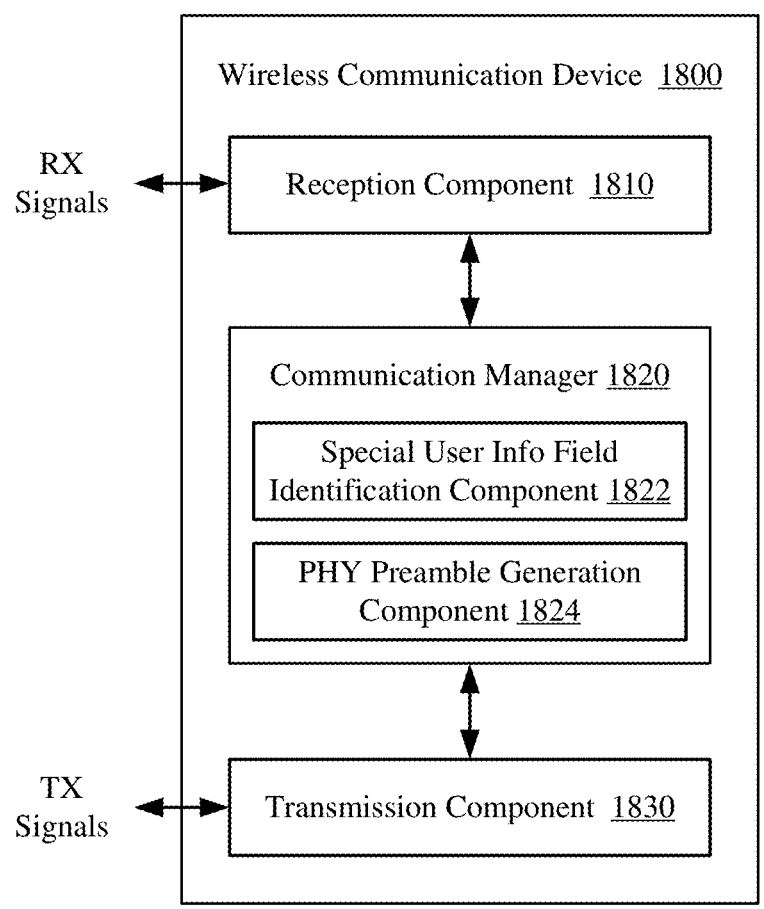
FIG. 18 shows a block diagram of an example wireless communication device according to some implementations.

FIG. 18 shows a block diagram of an example wireless communication device 1800 according to some implementations. In some implementations, the wireless communication device 1800 is configured to perform the process 1600 described above with reference to FIG. 16. The wireless communication device 1800 can be an example implementation of the wireless communication device 400 described above with reference to FIG. 4. For example, the wireless communication device 1800 can be a chip, SoC, chipset, package or device that includes at least one processor and at least one modem (for example, a Wi-Fi (IEEE 802.11) modem or a cellular modem).

The wireless communication device 1800 includes a reception component 1810, a communication manager 1820, and a transmission component 1830. The communication manager 1820 further includes a special user information field identification component 1822 and a PHY preamble generation component 1824. Portions of one or more of the components 1822 and 1824 may be implemented at least in part in hardware or firmware. In some implementations, at least some of the components 1822 or 1824 are implemented at least in part as software stored in a memory (such as the memory 408). For example, portions of one or more of the components 1822 and 1824 can be implemented as non-transitory instructions (or "code") executable by a processor (such as the processor 406) to perform the functions or operations of the respective component.

The reception component 1810 is configured to receive RX signals, over a wireless channel, from one or more other wireless communication devices. In some implementations, the RX signals may include a trigger frame soliciting a PPDU to be transmitted by the wireless communication device 1800, where the trigger frame includes a MAC header, a common information field that follows the MAC header, and one or more user information fields that follow the common information field. The common information field may carry information that is common to each user associated with the one or more user information fields. The transmission component 1830 is configured to transmit TX signals, over a wireless channel, to one or more other wireless communication devices. In some implementations the TX signals may include the PPDU including a PHY preamble. The communication manager 1120 is configured to control or manage communications with the one or more other wireless communication devices. In some implementations, the special user information field identification component 1822 may determine that a first user information field of the one or more user information fields carries information to be included in the preamble of the PPDU based on an AID value associated with the first user information field; and the PHY preamble generation component 1824 may generate the PHY preamble based on the information carried in the first user information field.

Figure 19:
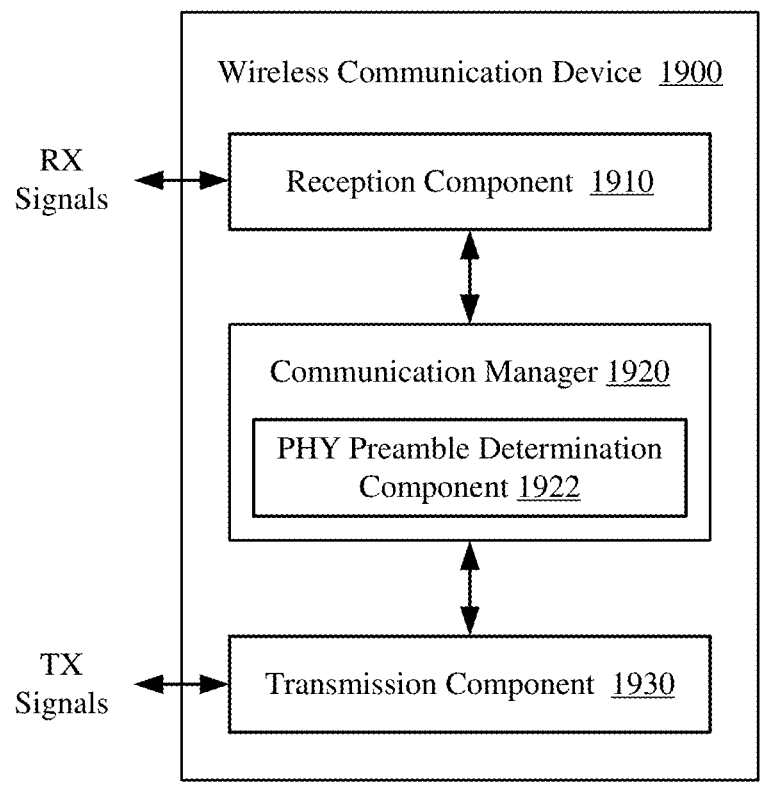
FIG. 19 shows a block diagram of an example wireless communication device according to some implementations.

FIG. 19 shows a block diagram of an example wireless communication device 1900 according to some implementations. In some implementations, the wireless communication device 1900 is configured to perform the process 1700 described above with reference to FIG. 17. The wireless communication device 1900 can be an example implementation of the wireless communication device 400 described above with reference to FIG. 4. For example, the wireless communication device 1900 can be a chip, SoC, chipset, package or device that includes at least one processor and at least one modem (for example, a Wi-Fi (IEEE 802.11) modem or a cellular modem).

The wireless communication device 1900 includes a reception component 1910, a communication manager 1920, and a transmission component 1930. The communication manager 1920 further includes a PHY preamble determination component 1922. Portions of the PHY preamble determination component 1922 may be implemented at least in part in hardware or firmware. In some implementations, the PHY preamble determination component 1922 is implemented at least in part as software stored in a memory (such as the memory 408). For example, portions of the PHY preamble determination component 1922 can be implemented as non-transitory instructions (or "code") executable by a processor (such as the processor 406) to perform the functions or operations of the respective component.

The reception component 1910 is configured to receive RX signals, over a wireless channel, from one or more other wireless communication devices. The communication manager 1920 is configured to control or manage communications with the one or more other wireless communication devices. In some implementations, the PHY preamble determination component 1922 may determine information to be included in a PHY preamble of a TB PPDU. The transmission component 1930 is configured to transmit TX signals to one or more other wireless communication devices. In some implementations the TX signals may include a trigger frame soliciting the TB PPDU to be transmitted, over a wireless channel, by a receiving device, where the trigger frame includes a MAC header, a common information field that follows the MAC header, and one or more user information fields that follow the common information field. The common information field may carry information that is common to each user associated with the one or more user information fields. In some implementations, the one or more user information fields may include a first user information field that carries the information to be included in the PHY preamble of the TB PPDU.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device, comprising:
   receiving a trigger frame soliciting a physical layer convergence protocol (PLCP) protocol data unit (PPDU) to be transmitted by the wireless communication device, the trigger frame including a medium access control (MAC) header, a common information field that follows the MAC header, and one or more user information fields that follow the common information field, the common information field carrying information that is common to each user associated with the one or more user information fields;
   determining that a first user information field of the one or more user information fields carries information to be included in a physical layer (PHY) preamble of the PPDU based on an association identifier (AID) value associated with the first user information field;
   generating the PHY preamble based on the information carried in the first user information field; and
   transmitting the PPDU including the PHY preamble, over a wireless channel, responsive to the reception of the trigger frame.

2. The method of claim 1, wherein the AID value is a special AID value and is not assigned to any wireless communication devices associated with the same basic service set (BSS) as the wireless communication device.

3. The method of claim 1, further comprising:
determining that a second user information field of the one or more user information fields carries additional information to be included in the PHY preamble based on an AID value associated with the second user information field.

4. The method of claim 1, wherein the PHY preamble includes a legacy signal field (L-SIG), a repeat of L-SIG (RL-SIG) that immediately follows L-SIG, and a universal signal field (U-SIG) that immediately follows RL-SIG and carries information for interpreting one or more subsequent fields of the PHY preamble.

5. The method of claim 4, wherein the generating of the PHY preamble comprises:
determining values for one or more subfields of U-SIG based on the information carried in the first user information field, the one or more subfields including at least one of a PPDU bandwidth subfield that carries information indicating a bandwidth of the wireless channel, a spatial reuse subfield that carries information indicating whether spatial reuse is permitted on one or more subchannels of the wireless channel, or a version identifier subfield that carries information indicating a version of a physical layer wireless communication protocol associated with the PPDU.

6. The method of claim 4, wherein the generating of the PHY preamble comprises:
determining values for one or more subfields of U-SIG based on the information carried in the first user information field, the one or more subfields including at least one of an uplink or downlink (UL/DL) subfield that carries information indicating whether the PPDU is transmitted in the uplink or the downlink direction, a BSS color subfield that carries information indicating a BSS color associated with the PPDU, a transmit opportunity (TXOP) subfield that carries information indicating a TXOP duration associated with the PPDU, or a PPDU format and compression mode subfield that carries information indicating a format of the PPDU.

7. The method of claim 4, wherein the generating of the PHY preamble comprises:
determining a number of reserved bits to be included in U-SIG based on the information carried in the first user information field.

8. The method of claim 4, further comprising:
determining a version of a physical layer wireless communication protocol associated with the PPDU based on the AID value associated with the first user information field; and
configuring a version identifier subfield of U-SIG to carry information indicating the determined version of the physical layer wireless communication protocol.

9. The method of claim 1, further comprising:
determining whether puncturing is to be performed on one or more subchannels of the wireless channel based on the information carried in the first user information field or information carried in the common information field.

10. The method of claim 1, further comprising:
determining a format of the trigger frame based on information carried in the common information field, the format being a legacy trigger frame format or a non-legacy trigger frame format; and
determining that the one or more user information fields includes the first user information field based on the determined format of the trigger frame.

11. The method of claim 1, further comprising:
determining a version of a physical layer wireless communication protocol associated with the one or more user information fields based on information carried in at least one of the common information field or the first user information field, the version of the physical layer wireless communication protocol being the same for each of the one or more user information fields; and
interpreting the information carried in the first user information field based on the determined PHY version.

12. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
receive a trigger frame soliciting a physical layer convergence protocol (PLCP) protocol data unit (PPDU) to be transmitted by the wireless communication device, the trigger frame including a medium access control (MAC) header, a common information field that follows the MAC header, and one or more user information fields that follow the common information field, the common information field carrying information that is common to each user associated with the one or more user information fields;
determine that a first user information field of the one or more user information fields carries information to be included in a physical layer (PHY) preamble of the PPDU based on an association identifier (AID) value associated with the first user information field;
generate the PHY preamble based on the information carried in the first user information field; and
transmit the PPDU including the PHY preamble, over a wireless channel, responsive to the reception of the trigger frame.

13. The wireless communication device of claim 12, wherein the PHY preamble includes a legacy signal field (L-SIG), a repeat of L-SIG (RL-SIG) that immediately follows L-SIG, and a universal signal field (U-SIG) that immediately follows RL-SIG and carries information for interpreting one or more subsequent fields of the PHY preamble.

14. The wireless communication device of claim 13, wherein the generating of the PHY preamble comprises:
determining values for one or more subfields of U-SIG based on the information carried in the first user information field, the one or more subfields including at least one of a PPDU bandwidth subfield that carries information indicating a bandwidth of the wireless channel, a spatial reuse subfield that carries information indicating whether spatial reuse is permitted on one or more subchannels of the wireless channel, or a version identifier subfield that carries information indicating a version of a physical layer wireless communication protocol associated with the PPDU.

15. The wireless communication device of claim 13, wherein the generating of the PHY preamble comprises:
determining values for one or more subfields of U-SIG based on the information carried in the first user information field, the one or more subfields including at least one of an uplink or downlink (UL/DL) subfield that carries information indicating whether the PPDU is transmitted in the uplink or the downlink direction, a BSS color subfield that carries information indicating a BSS color associated with the PPDU, a transmit opportunity (TXOP) subfield that carries information indicating a TXOP duration associated with the PPDU, or a PPDU format and compression mode subfield that carries information indicating a format of the PPDU.

16. The wireless communication device of claim 13, wherein the generating of the PHY preamble comprises:
determining a number of reserved bits to be included in U-SIG based on the information carried in the first user information field.

17. The wireless communication device of claim 13, wherein execution of the processor-readable code is further configured to:
determine a version of a physical layer wireless communication protocol associated with the PPDU based on the AID value associated with the first user information field; and
configure a version identifier subfield of U-SIG to carry information indicating the determined version of the physical layer wireless communication protocol.

18. The wireless communication device of claim 12, wherein execution of the processor-readable code is further configured to:
determine whether puncturing is to be performed on one or more subchannels of the wireless channel based on the information carried in the common information field or the first user information field.

19. A method for wireless communication performed by a wireless communication device, comprising:
determining information to be included in a physical layer (PHY) preamble of a trigger-based (TB) physical layer convergence protocol (PLCP) protocol data unit (PPDU); and
transmitting a trigger frame soliciting the TB PPDU to be transmitted, over a wireless channel, by a receiving device, the trigger frame including a medium access control (MAC) header, a common information field that follows the MAC header, and one or more user information fields that follow the common information field, the common information field carrying information that is common to each user associated with the one or more user information fields, the one or more user information fields including a first user information field that carries the information to be included in the PHY preamble of the TB PPDU.

20. The method of claim 19, wherein the first user information field is associated with a special association identifier (AID) value and is not assigned to any wireless communication devices associated with the same basic service set (BSS) as the receiving device.

21. The method of claim 20, further comprising:
determining the special AID value based on a version of a physical layer wireless communication protocol associated with the TB PPDU.

22. The method of claim 19, wherein the one or more user information fields further includes a second user information field that carries additional information to be included in the PHY preamble.

23. The method of claim 19, wherein the PHY preamble includes a legacy signal field (L-SIG), a repeat of L-SIG (RL-SIG) that immediately follows L-SIG, and a universal signal field (U-SIG) that immediately follows RL-SIG and carries information for interpreting one or more subsequent fields of the PHY preamble.

24. The method of claim 23, wherein the information carried in the first user information field indicates values for one or more subfields of U-SIG, the one or more subfields including at least one of a PPDU bandwidth subfield that carries information indicating a bandwidth of the wireless channel, a spatial reuse subfield that carries information indicating whether spatial reuse is permitted on one or more subchannels of the wireless channel, or a version identifier subfield that carries information indicating a version of a physical layer wireless communication protocol associated with the PPDU.

25. The method of claim 23, wherein the information carried in the first user information field indicates values for one or more subfields of U-SIG, the one or more subfields including at least one of an uplink or downlink (UL/DL) subfield that carries information indicating whether the PPDU is transmitted in the uplink or the downlink direction, a BSS color subfield that carries information indicating a BSS color associated with the PPDU, a transmit opportunity (TXOP) subfield that carries information indicating a TXOP duration associated with the PPDU, or a PPDU format and compression mode subfield that carries information indicating a format of the PPDU.

26. The method of claim 23, wherein the information carried in the first user information field indicates a number of reserved bits to be included in U-SIG.

27. The method of claim 19, further comprising:
determining whether puncturing is to be performed on one or more subchannels of the wireless channel, at least one of the common information field or the first user information field carrying channel puncturing information indicating whether puncturing is to be performed on the one or more subchannels.

28. The method of claim 19, wherein the common information field carries information indicating a format of the trigger frame, the format being a legacy trigger frame format or a non-legacy trigger frame format.

29. The method of claim 19, wherein at least one of the common information field or the first user information field further carries information indicating a version of a physical layer wireless communication protocol associated with the one or more user information fields, the version of the physical layer wireless communication protocol being the same for each of the one or more user information fields.

30. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
determine information to be included in a physical layer (PHY) preamble of a trigger-based (TB) physical layer convergence protocol (PLCP) protocol data unit (PPDU); and
transmit a trigger frame soliciting the TB PPDU to be transmitted, over a wireless channel, by a receiving device, the trigger frame including a medium access control (MAC) header, a common information field that follows the MAC header, and one or more user information fields that follow the common information field, the common information field carrying information that is common to each user associated with the one or more user information fields, the one or more user information fields including a first user information field that carries the information to be included in the PHY preamble of the TB PPDU.

31. The wireless communication device of claim 30, further comprising:
determining an association identifier (AID) value for the first user information field based on a version of a physical layer wireless communication protocol associated with the TB PPDU.

32. The wireless communication device of claim 30, wherein the PHY preamble includes a legacy signal field (L-SIG), a repeat of L-SIG (RL-SIG) that immediately follows L-SIG, and a universal signal field (U-SIG) that immediately follows RL-SIG and carries information for interpreting one or more subsequent fields of the PHY preamble.

33. The wireless communication device of claim 32, wherein the information carried in the first user information field indicates values for one or more subfields of U-SIG, the one or more subfields including at least one of a PPDU bandwidth subfield that carries information indicating a bandwidth of the wireless channel, a spatial reuse subfield that carries information indicating whether spatial reuse is permitted on one or more subchannels of the wireless channel, or a version identifier subfield that carries information indicating a version of a physical layer wireless communication protocol associated with the PPDU.

34. The wireless communication device of claim 32, wherein the information carried in the first user information field indicates values for one or more subfields of U-SIG, the one or more subfields including at least one of an uplink or downlink (UL/DL) subfield that carries information indicating whether the PPDU is transmitted in the uplink or the downlink direction, a BSS color subfield that carries information indicating a BSS color associated with the PPDU, or a transmit opportunity (TXOP) subfield that carries information indicating a TXOP duration associated with the PPDU, or a PPDU format and compression mode subfield that carries information indicating a format of the PPDU.

35. The wireless communication device of claim 32, wherein the information carried in the first user information field indicates a number of reserved bits to be included in U-SIG.

36. The wireless communication device of claim 30, wherein execution of the processor-readable code is further configured to:
determine whether puncturing is to be performed on one or more subchannels of the wireless channel, at least one of the common information field or the first user information field carrying channel puncturing information indicating whether puncturing is to be performed on the one or more subchannels.

* * * * *